(12) United States Patent
Gerendai et al.

(10) Patent No.: US 7,542,472 B1
(45) Date of Patent: Jun. 2, 2009

(54) DATA TRANSMISSION

(75) Inventors: Magdolna Gerendai, Budapest (HU); Mihaly Toth, Budapest (HU); Gabor Paller, Budapest (HU)

(73) Assignee: Nokia Corporation, Espoo (FI)

( * ) Notice: Subject to any disclaimer, the term of this patent is extended or adjusted under 35 U.S.C. 154(b) by 1019 days.

(21) Appl. No.: 10/130,621

(22) PCT Filed: Nov. 7, 2000

(86) PCT No.: PCT/FI00/00972

§ 371 (c)(1),
(2), (4) Date: Aug. 19, 2002

(87) PCT Pub. No.: WO01/37507

PCT Pub. Date: May 25, 2001

(30) Foreign Application Priority Data

Nov. 17, 1999 (FI) .................................. 19992470

(51) Int. Cl.
*H04L 12/28* (2006.01)
*H04L 12/66* (2006.01)
*H04J 3/16* (2006.01)
*H04W 4/00* (2009.01)

(52) U.S. Cl. .................. 370/394; 370/469; 370/352; 370/338

(58) Field of Classification Search ............. 370/278, 370/279, 282, 285, 394, 352, 470, 471, 472, 370/473, 474, 401, 328, 466, 465, 310, 229, 370/230

See application file for complete search history.

(56) References Cited

U.S. PATENT DOCUMENTS

| 5,151,899 | A | * | 9/1992 | Thomas et al. ............... 370/394 |
| 5,386,412 | A | | 1/1995 | Park et al. ...................... 370/53 |
| 5,448,561 | A | * | 9/1995 | Kaiser et al. ................. 370/471 |
| 5,754,831 | A | | 5/1998 | Berman ...................... 395/500 |
| 5,838,913 | A | | 11/1998 | Lysejko et al. ......... 395/200.38 |
| 6,094,423 | A | * | 7/2000 | Alfano et al. ................ 370/310 |

(Continued)

FOREIGN PATENT DOCUMENTS

EP 0 770 962 A2 2/1997

(Continued)

OTHER PUBLICATIONS

"Wireless Transaction Protocol Specification", WAP WTM Wireless Application Protocol Forum, XP002901533, Apr. 30, 1998.

(Continued)

*Primary Examiner*—Hanh Nguyen
(74) *Attorney, Agent, or Firm*—Harrington & Smith, PC

(57) ABSTRACT

The invention relates to a method of carrying out a transaction involving transmission of data over a link between and a mobile terminal and a gateway. The data is in the form of a plurality of data messages wherein each message comprises at least one data packet. The number of messages is not predetermined. The method comprising the steps of: the mobile terminal acknowledging receipt of data packets so as to provide a reliable connection; the gateway notifying the receiver of the last data packet in each data message; and the sender notifying the receiver of the last data message. The invention is particularly applicable to transactions carried out according to the Wireless Transaction Protocol.

38 Claims, 9 Drawing Sheets

U.S. PATENT DOCUMENTS

| | | | | |
|---|---|---|---|---|
| 6,128,283 | A * | 10/2000 | Sabaa et al. | 370/236 |
| 6,243,365 | B1 * | 6/2001 | Mansfield et al. | 370/310 |
| 6,389,016 | B1 * | 5/2002 | Sabaa et al. | 370/389 |
| 6,549,773 | B1 * | 4/2003 | Linden et al. | 455/426.1 |
| 6,721,335 | B1 * | 4/2004 | Gregg | 370/473 |
| 6,804,202 | B1 * | 10/2004 | Hwang | 370/282 |

FOREIGN PATENT DOCUMENTS

| | | |
|---|---|---|
| WO | 96/34374 | 10/1996 |
| WO | 00/46963 | 8/2000 |

OTHER PUBLICATIONS

Khare, R. "Effect Considered Harmful", http://www.4k-associates.com/IEEE-17-WAP-BIG.html, Apr. 9, 1999.

WAP White Paper, Au-System Radio, XP002901535, Feb. 1999.

"Wireless Application Protocol WDP and WCMP Adaptation for Access of a WAP Proxy Server to a Wireless Data Gateway", Wireless Application Protocol Forum Ltd., XP002901536, Nov. 5, 1999.

* cited by examiner

|  | TR-Stream Invoke | TR-Stream Invoke Data | TR-Stream Result | TR-Stream Result Data | TR-Abort | TR-Stream Invoke End-Of-Data | TR-Stream Invoke Data End-Of-Data | TR-Stream Result End-Of-Data | TR-Stream Result Data End-Of-Data |
| --- | --- | --- | --- | --- | --- | --- | --- | --- | --- |
| TR-Stream Invoke |  |  |  |  |  |  |  |  |  |
| TR-Stream Invoke Data | X | X |  |  |  |  |  | X | X |
| TR-Stream Result | X |  |  |  |  | X | X |  |  |
| TR-Stream Result Data |  | X | X | X |  | X | X |  |  |
| TR-Abort | X | X | X | X |  | X | X | X | X |
| TR-Stream Invoke End-Of-Data |  |  |  |  |  |  |  |  |  |
| TR-Stream Invoke Data End-Of-Data |  | X | X | X |  | X | X |  |  |
| TR-Stream Result End-Of-Data | X | X |  |  |  |  |  |  |  |
| TR-Stream Result Data End-Of-Data |  | X | X | X |  | X | X |  |  |

Fig. 5

DATA TRANSMISSION

The invention relates to the transmission of data. It is particularly, but not exclusively, related to the transmission of data to and from mobile terminals. This data may be obtained by using the Internet.

With increased use of mobile cellular terminals, there is a growing demand for such terminals to send and receive data over wireless links. For this purpose a portable computer connected to a cellular telephone or from an integrated computer/cellular phone device may be used. One example of such data transmission is browsing the Internet.

The term "Internet" is commonly used to describe information which can be accessed using a terminal, typically a PC, usually connected via a modem, to a telecommunications network. The content can be stored at many different sites remote from the accessing computer, although each of the remote sites is also linked to the telecommunications network. The content can be structured using Hypertext Mark-up Language (HTML). The Internet is made workable by the specification of a standard communications system which makes use of a number of protocols, such as the Transfer Control Protocol (TCP), the User Datagram Protocol (UDP), and the Internet Protocol (IP), to control the flow of data around the numerous different components of the Internet. TCP and UDP are concerned with the transmission of Internet data with different quality of service characteristics, such as in-order, reliable delivery of data, or unreliable delivery of independent data packets. IP is concerned with the structuring and routing of data. On top of that, other application specific protocols may be provided to manage and manipulate the various kinds of information available via the Internet, for example HTTP to access HTML content, FTP to access files or SMTP to access e-mail.

The Internet is physically constructed from a hierarchy of telecommunications and data communications networks, for example local area networks (LANs), regional telephone networks, and international telephone networks. These networks are connected internally and externally by so-called "routers" which receive data from a source host, or a previous router in a transmission chain, and route it to the destination host or the next router in the transmission chain.

Obtaining access to the Internet generally involves having sessions between a terminal, such as a mobile terminal, and a server. A session is a series of interactions between a terminal and a server having a well-defined beginning and end and involving agreed-upon characteristics. Typically, a session involves a peer announcing to another peer a desire to establish a session, both peers negotiating the characteristics of the session, the peers engaging in a variety of transactions and one of the peers ending the session. The characteristics which are negotiated are typically the length of packets to be exchanged, the character sets which can be understood and manipulated and the versions of protocols which are to be used.

As the demand for multimedia and other wireless services increases, the available wireless bandwidth is also increasing, and so the need to be able to provide the large data transfers wirelessly is also increasing.

In order to provide standardisation of communication to and from mobile terminals, the Wireless Application Protocol (WAP) has been proposed. This is a set of industry-wide specifications suitable for developing applications and services to operate over wireless communications networks. WAP specifies an application framework and network protocols for wireless devices such as mobile telephones, pagers and personal digital assistants (PDAs). WAP is applicable to a number of different systems including GSM-900, GSM-1800, GSM-1900, CDMA IS-95, TDMA IS-136, wide-band IS-95 and third generation systems such as IMT-2000, UMTS and W-CDMA.

WAP is described in documents WAP WTP Wireless Application Protocol Wireless Transaction Protocol Specification (version 30 Apr. 1998) and WAP White Paper, AV-System Radio, February 1999.

WAP has architecture based on the following components or layers:

An application layer (called the Wireless Application Environment or WAE) is a general-purpose application environment. Its purpose is to provide an interoperable environment which allows operators and service providers to provide applications and services to a variety of wireless platforms.

A session layer (called the Wireless Session Protocol or WSP) provides the application layer with a consistent interface for two session services. The first is a connection-orientated service that operates above a transaction layer protocol WTP (referred to below). The second is a connectionless service that operates above a secure or non-secure datagram service WDP (referred to below).

A transaction layer (called the Wireless Transaction Protocol or WTP) runs on top of a datagram service that provides a light-weight transaction orientated protocol that is suitable for implementation in "thin" clients such as mobile terminals. WTP operates over secure or non-secure wireless datagram networks and provides the following features:

Three classes of transaction requests:
class 0 is for unreliable one way requests;
class 1 is for reliable one-way requests; and
class 2 is for reliable two-way request-reply transactions, Optional user-to-user reliability in which the WTP user triggers the confirmation of each received message, Optional out-of-band data on acknowledgements, Protocol Data Unit (PDU) concatenation and delayed acknowledgements to reduce the number of messages sent, Asynchronous transactions.

A security layer (called the Wireless Transport Layer Security or WTLS). This is based on the industry standard Transport Layer Security (TLS) protocol. It is optimised for use over narrow band communications channels. It includes data integrity, privacy, authentication and denial-of-service protection. Applications are able selectively to enable or disable WTLS features depending on their network requirements and the characteristics of the underlying network.

A transport layer (called the Wireless Datagram Protocol or WDP). The WDP layer operates above the data capable bearer services supported by the various network types. As a general transport service, WDP offers a consistent service to the upper layer protocols of WAP and communicates transparently over one of the available bearer services.

The layers are arranged in a protocol stack with each of the layers of the architecture being accessible by the layers above as well as by other services and application. These protocols are designed to operate over a variety of different bearer services. A specification describing this architecture and the protocol layers is available from the Wireless Application Protocol forum website.

WAP is based upon transactions. Most transactions are either of the push type or of the pull (request-reply) type. In push type transactions a peer sends information which has not been specifically requested and in pull type transactions, a peer specifically requests to receive information from another peer. A pull type transaction can take the form of an Invoke transaction in WAP between a client (sender) and a server (receiver). Such a transaction involves the client sending a request (Invoke) to the server and the server returning a response (Result) which includes data according to the request. The client and the server both have WAP protocol stacks and the request and the response are effected by means of service primitives invoked between layers in each of the stacks so that messages in the form of protocol data units flow between the client and the server over a suitable bearer layer. Service primitives represent the logical exchange of information and control between a protocol layer and another entity using it, such as between the session layer and the application environment (WAE). They consist of commands and their respective responses associated with the particular service provided. Invoking a service primitive in a peer on one side of a communication link results in an event being generated in a peer in the other side of the link.

In this description the term messages is used to refer both to service primitives and to PDUs. A message is a logical abstraction of a service data unit (SDU) appearing in a service primitive request so that it appears on a peer side as an SDU in a service primitive indication. In the present case the SDU is the user data field in service primitives.

If any of the messages have a length which exceeds the maximum transfer unit (MTU) size of the bearer services, that is the maximum size of a single packet as specified by a particular bearer, then before the message is sent, it is segmented into a sequence of packets in the WTP layer. The packets are transmitted individually or in groups, and then re-assembled once they have been received. This process is referred to as segmentation and re-assembly (SAR). SAR assigns consecutive sequence numbers to segmented data packets so that their order can be re-created on re-assembly. In WAP the maximum size of a segmented message is 256 packets. Since each packet has a maximum size of 1 to 2 Kbytes (typically 1.5 Kbytes), the maximum size of a message is typically less than 0.5 Mbytes.

When the data packets are received and the message is re-assembled by the WTP, the re-assembled message is then passed on to a WTP user, that is the WSP or an application directly above the WTP. However, since the WTP only provides the re-assembled message to the upper level once all of the segmented data packets have arrived, this means that the sender and the receiver have to use data buffers equal to the maximum size of the message.

The units of data transfer are the PDUs. A PDU comprises an integer number of octets and consists of a header (comprising a fixed part and a variable part) and data (if any is present). The fixed part contains information which is necessary for consistent and satisfactory communication. The variable part, which needs to be attached only to the fixed part, contains optional information which is not absolutely necessary. The fixed part of the header contains frequently used parameters and a code identifying a particular PDU. The length and the structure of the fixed part are defined by the PDU code. Commonly used PDUs include Invoke, Result, Acknowledge and Abort. Commonly used PDU codes in WAP are defined in the Wireless Transaction Protocol Specification.

The parameters of the fixed part of a PDU header include:

The Continue flag (CON) which indicates the presence of any Transport Information Items (TPIs) in the variable part.

The Group Trailer (GTR) flag which indicates the last packet of a transmission group (the GTR packet).

The Transmission Trailer (TTR) flag which indicates the last packet of the segmented message (the TTR packet).

The Packet Sequence Number (PSN) which is used for numbering segmented messages and data packets. It indicates the position of the data packet inside a sequenced data flow. The length of this parameter is 8 bits.

The re-transmission indicator (RID) which enables the receiver to differentiate between packets duplicated by the network and packets re-transmitted by the sender.

The Transaction Identifier (TID) which is used to associate a packet with a particular transaction.

The Transaction Class (TCL) which indicates the desired transaction class in the invoke message. It is chosen by the initiator.

The TID new flag which is set when the initiator has "wrapped" the TID value, that is when the range of TID values has been fully incremented so that the next TID value re-starts at the lower end of its range and is therefore lower than the previous TID value.

The U/P flag which, when set, indicates that an initiator requires a user acknowledgement from the server WTP user. It causes the WTP user to confirm every received message.

The parameter Number of Missing Packets which indicates the number of packets missed during the reception of the current group. If this parameter has zero value, all packets in the group are missed, otherwise after this parameter the packet number of the missing packet(s) are listed.

The parameter PSN(s) of Missing Packet(s) which is a list of packet sequence numbers for the missing packets, the re-transmission of which is requested.

The variable part of the PDU header is used to define less frequently used parameters. Variable parameters are carried in Transport Information Items (TPIs). These can be used for a number of purposes such as indicating to the peer the maximum group size and the group delay.

Data buffers in the terminal and in the server need to be large enough to hold transmitted data. In the WAP standard one message is sent inside a transaction by a sender to a receiver. If the data is in a single block, for example a message 100 KB long, the receiver needs a 100 KB data buffer to store the whole message. However, certain messages do not have to be stored and so a data buffer is not necessary for the purpose of the message. This is the case for the data stream from a video telephone; it does not have to be stored since it can be sent directly to a video display to be displayed.

TCP is used to transmit large amounts of data in wired networks. However, it is not particularly suitable for wireless networks. It requires a connection set-up having a round-trip. It starts a transaction slowly. It has cumulative acknowledgements in case of packet loss, which occurs often in wireless environments. These cumulative acknowledgements are undesirable because they generate too much data traffic. In wired networks, if packets are lost, this is generally due to congestion of routers. To deal with this, the data transmission rate by the sender is reduced and so data transmission takes more time. In wireless networks packet loss is common and may be due to a number of factors unrelated to congestion, such as cell hand-over or errors caused in the wireless link. Therefore, packet loss does not necessarily provide a reason for the transmission rate to be reduced.

According to a first aspect of the invention there is provided a method of carrying out a transaction in accordance with claim 1.

Of course, where it is stated that the receiver acknowledges receipt of data packets, it may be that in certain circumstances, the data packets may not actually be received. In such circumstances, the receiver may notify the sender that a packet or packets have not been received.

Preferably the link is a wireless link.

Preferably the message is not of predetermined length. In this context, "predetermined" means that the receiver knows how many messages or how many packets may be received before they have been received. In one embodiment of the invention, the data may only comprise one message.

In this context, "reliable" means acknowledged so that the sender knows that the message has been received by the receiver. By providing a sequence of reliable data packets, transmission of the data message has the character of a data stream. Since individual packets are reliably received, then it is not necessary to provide a large buffer to contain the whole of an arbitrarily long message. In the case of a videoconference transmission, this could be a huge amount of data and so would require a huge buffer.

In one embodiment the invention uses many features of the WAP standard and architecture and is backward compatible with WAP even though it expands the amount of transaction data. The invention provides more efficient transfer of large amounts of data than is possible in using sequential individual transactions. It enables transmission of an arbitrarily long sized stream-like sequence of messages inside a transaction.

Preferably the invention is used within the WAP standard. It may form the basis of a new transaction class which has one reliable invoke message and one reliable Result message. The invoke and Result messages are conditionally expanded with reliable data messages thus providing for transmission of a large amount of data.

Preferably in there can be more than one transaction outstanding at any one time. Preferably there can be a number of asynchronous transactions existing in a single session.

Preferably the packets are sent in groups of packets. The receiver may acknowledge a complete group when all packets from the group have been received. This may occur by the receiver acknowledging the last packet of a group when it has confirmed that the other packets of the group have been received. In this way, packets other than the last packet are implicitly acknowledged by acknowledgement of the group.

Preferably, during transfer of the data message, the data packets are numbered consecutively. A segmentation and re-assembly technique such as SAR may be used. However, segmentation may not be used. Preferably the sequence of data packets is ordered by PSN. This may also enable missing packets to be identified. The arbitrary length of the data message may be provided by having PSNs which wrap around.

Preferably communication between the sender and the receiver is bi-directional within the transaction. There may be two channels provided one for transmitting data from an initiator to a responder and the other for transmitting data in the opposite direction. By providing two channels, the invention provides full-duplex reliable transaction service. Preferably each of the channels is closed by sending the last message of the data. One WSP session may comprise several transactions of this type. The invention allows for interactive communication.

The transaction may be started by an Invoke command. Once started, it may be continued by Stream Data commands. Data messages according to the invention may be transmitted either by the initiator or responder of a transaction. Preferably data transmission over one channel is terminated when the sender sends a DataEnd TPI and it is received by the receiver. If transmission over both channels is terminated the transaction may be terminated.

According to a second aspect of the invention there is provided a mobile terminal for transmitting data in accordance with claim 31.

According to a third aspect of the invention there is provided a gateway for transmitting data in accordance with claim 32.

According to a fourth aspect of the invention there is provided a data transmission system in accordance with claim 33.

According to a fifth aspect of the invention there is provided a data transmission system in accordance with claim 34.

According to a sixth aspect of the invention there is provided a computer program product stored on a computer readable medium in accordance with claim 35.

According to a seventh aspect of the invention there is provided a method of carrying out a transaction over a link between and a sender and a receiver to transmit data which is not of predetermined length in the form of a plurality of data packets, the method comprising the steps of:

applying a packet sequence number to the packets the packet sequence number having a range from a first end defined by a first packet sequence number to a second end defined by a last packet sequence number;

wrapping the packet sequence number around when it reaches one of the ends of its range.

Although it is preferred that the packet sequence number is consecutive for each packet, it may increase or decrease from one packet to a following packet. It may change in steps of one from one packet to a following packet or it may change in steps other than of one, two for examples or some other integer.

An embodiment of the invention will now be described by example only with reference to the accompanying drawings in which:

FIG. 5 shows a table of valid service primitive sequences;

In one embodiment, the invention provides a new transaction class for the WAP standard that enables data of an arbitrarily long length to be transmitted. This new class is class 3. Such data may a data stream originating from a videoconference, it may be a multi-media stream or it may be a download of software.

A class 3 transaction will now be described. The following service primitives are used during a class 3 transaction:

TR-Stream Invoke;

TR-Stream Result;

TR-Stream Invoke Data;

TR-Stream Result Data; and

TR-Abort.

A prefix of TR—signifies that a service primitive is being used between layers in a protocol stack. A prefix of S—indicates that a service primitive is being used in a session layer (such as WSP).

In the following description, a service primitive describes the request to the WTP from either an upper or a lower local layer. This results in a PDU being generated which is a coded packet (containing a header and data), which is sent through the network during the transaction.

Figure 1:
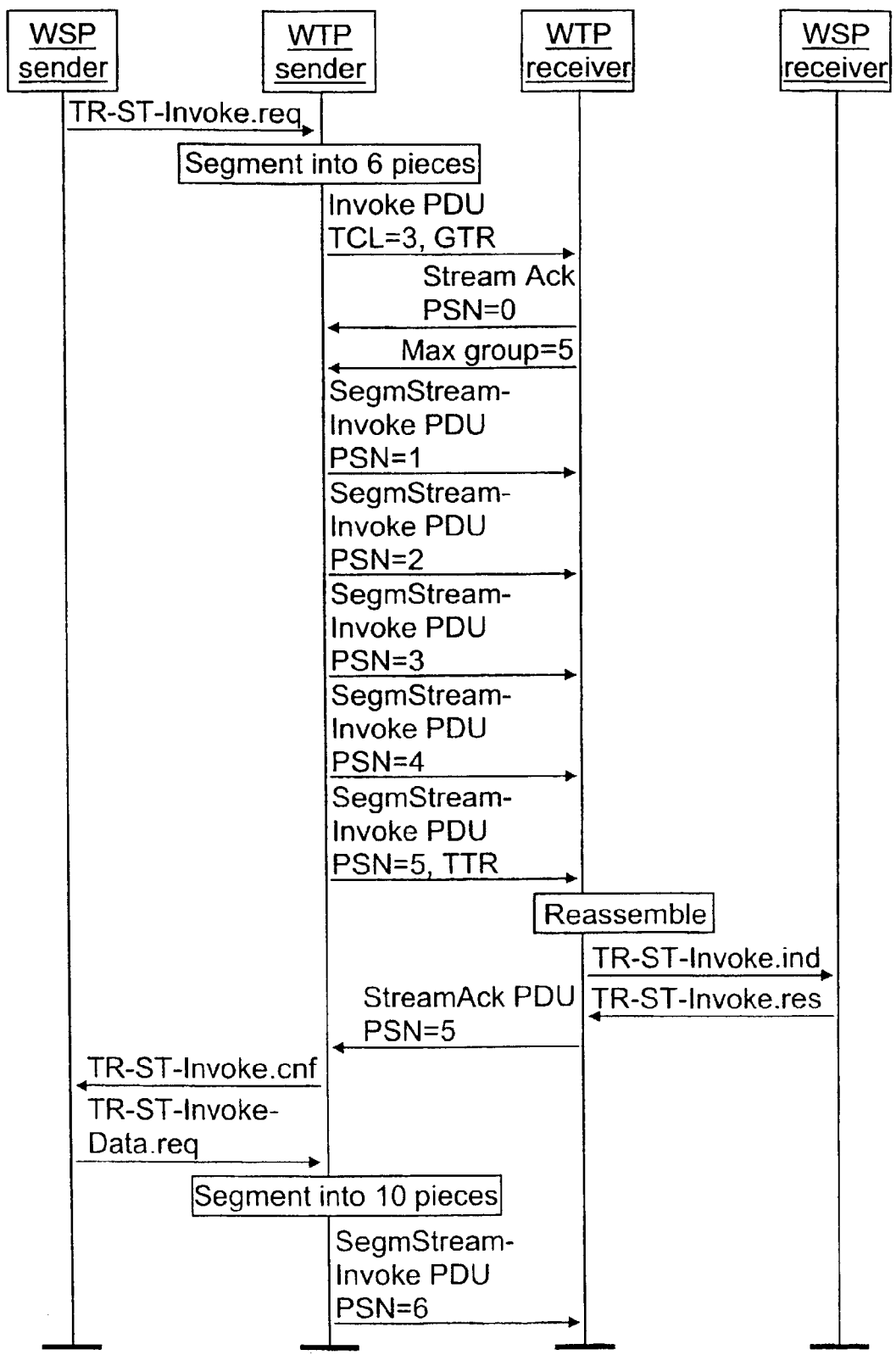
FIG. 1 shows a transaction in which segmentation is used.

FIG. 1 shows part of a class 3 transaction in which data is transmitted. The transaction is initiated by one communicating entity, referred to as an initiator, with another communicating entity, referred to as a responder. The initiator and the responder communicate over two channels, each channel having a sender and a receiver depending on the direction of data flow. There is an input channel and an output channel; the input channel is established by the initiator for its data flow and the output channel is established by the responder for its data flow. Since there are two channels, the initiator and the responder each act as both a sender and as a receiver of data. The term "channel" refers to a stream-like data path for transmitting an ordered sequence of messages in one direction. The term does not refer to a physical entity but refers to the logical operations which provide this result.

The WTP user can be either the WSP or it can be the application communicating directly with the WTP over a connection. In the former case each transaction is accomplished in the context of a session. In the latter case the WSP and the WSP user are simply on the same address quadruplet.

FIG. 1 only shows messages being transmitted over an input channel from the initiator (sender) to the responder (receiver). Messages transmitted on the output channel, particularly results of data being transmitted by the responder back to the initiator, are not shown. In any one channel acknowledgements of data flow in the opposite direction to the data.

Before describing the transaction of FIG. 1 in detail, it will be described in simple terms in order to illustrate how it proceeds. A Stream Invoke message is sent on the input channel. The responder responds on the output channel with a Stream Result message. Both messages may then be followed by additional Stream Data messages, which are considered to be continuations of the original message and which carry additional data. Packets in the additional data messages are given consecutive PSNs so that the receiver of the data messages is able to order the data messages correctly when they are received. Either channel in the transaction can be terminated by an End-Of-Data message. The transaction is terminated if both the initiator and the responder receive End-Of-Data messages. All messages are acknowledged. A message may comprise an individual packet or may be segmented into a number of packets.

The PDUs used in class 3 have the following codes:

| PDU type | PDU Code |
| --- | --- |
| Invoke | 0x01 |
| Result | 0x02 |
| Acknowledgement | 0x03 |
| Abort | 0x04 |
| Segmented Stream Invoke | 0x08 |
| Segmented Stream Result | 0x09 |
| Stream Negative Acknowledgement | 0x0A |

The format of the fixed header structure of the PDU in the invention is the same as is used in the WAP standard. The use and operation of the PDUs are described below.

During the transaction, service primitives are invoked between a provider layer and a user layer in a WAP protocol stack in each of the initiator and the responder. The particular parameters which can be invoked by a service primitive are selected from the following:

The source address. This is the unique address of the device making a request to the WTP layer. It may be an MSISDN number, IP address, X.25 address or other identifier.

The source port number. This is associated with the source address.

The destination address. This is the address of the user data submitted to the WTP layer. The destination address may be an MSISDN number, IP address, X.25 address or other identifier.

The destination port number. This is associated with the destination address for the requested or an existing transaction.

The user data. This is carried by the message generated from the primitive being invoked. The unit of data submitted to or received from the WTP layer, that is the SDU. This is the complete unit (message) of data which the higher layer has submitted to the WTP layer for transmission. The WTP layer transmits the Datagram SDU and delivers it to its destination without any manipulation of its contents.

End-Of-Data. This is used to indicate that a particular SDU carries the last part of the user data which will be sent to a responder in a transaction.

The transaction handle. This is an index returned to a higher layer so that it can identify the transaction and associate data received with an active transaction. The transaction handle uniquely identifies a transaction. It is an alias for the source address, source port, destination address and destination port of the transaction. The transaction handle has local significance only.

Exit info. Additional user data to be sent to the originator of the sequence of messages on its completion. This is only present in TR-Stream-Result and TR-Stream-Result-Data service primitives.

Referring back now to FIG. 1, the transaction will now be described in terms of the sequence of service primitives occurring in the protocol stacks of the initiator and the responder and the PDUs passing between them. A new class 3 transaction is initiated in the initiator by a layer above the WTP layer (referred to as the WTP user (initiator)), such as the WAE or the WSP, invoking the TR-Stream Invoke request service primitive in the WTP layer (referred to as the WTP provider (initiator)). When the new transaction is invoked, the initiator increments the Transaction Identifier (TID) by one to indicate that it is a new transaction. Within a particular class 3 transaction all messages (including all PDUs) carry the same TID.

Invoking the TR-Stream Invoke request service primitive invokes parameters in the WTP provider (initiator) which are required to set up the transaction. The user data is also included. The parameters included in the TR-Stream Invoke service primitive are shown in the following table:

|  | Primitive TR-Stream Invoke | | | |
| --- | --- | --- | --- | --- |
| Parameter | req | ind | res | cnf |
| Source Address | M | M(=) | | |
| Source Port | M | M(=) | | |
| Destination Address | M | M(=) | | |
| Destination Port | M | M(=) | | |
| Ack-Type | M | M(=) | | |
| User-Data | O | C(=) | | |
| End-Of-Data | M | C(=) | | |
| Handle | M | M(=) | M | M |

In this table and the tables below, the legends M, O and C have the following meanings:
M means that a parameter is mandatory and must be present;
O means that a parameter is optional and may be omitted; and
C means that a parameter is conditional depending on the values of other parameters.

The Stream Invoke service primitive receives the Invoke PDU header and then the WTP provider (initiator) sends the Invoke PDU with an implicit packet number of zero. The Invoke PDU is always the first message of the transaction. It contains the TCL parameter. The available transaction classes are given below:

| Class | TCL |
| --- | --- |
| 0 | 0x00 |
| 1 | 0x01 |
| 2 | 0x02 |
| 3 | 0x03 |

In this case the PDU header indicates that the transaction is of class 3. The first time a PDU is transmitted the re-transmission indicator (RID) field in the header is clear. It should be noted that the TCL to identify a class 3 transaction only requires two bits like the TCLs for classes 0, 1 and 2 and is thus backward compatible with the WAP standard. If the responder does not support class 3 transactions, the transaction is aborted by the responder.

When an Invoke PDU is received, the WTP provider (responder) checks the TID and determines whether a verification has to be initiated. If so, the WTP provider (responder) starts a TID verification procedure. If not, it delivers the message to the WTP user (responder). The Acknowledgement PDU, Ack PDU, is used in the TID verification process of class 3 transactions.

The structure of the message will now be described with reference an example shown in FIG. 2. If the Stream Invoke message size exceeds the MTU for the network, the message is segmented into an ordered sequence of packets. In this example, there is a stream invoke packet having a PSN of 0, a first set of packets having PSNs of 1 to 16 and a second set of packets having PSNs of 17 to 33. At the beginning of transmission of the message, the End-Of-Data flag in the Invoke service primitive in the initiator is cleared to indicate that further data packets are to be transmitted. If the End-Of-Data flag were not cleared, this would indicate that no further SDUs are to come. The GTR flag set in a packet indicates the end of a group. The TTR flag set in a packet indicates the end of an SDU. This may mark the division between two SDUs or the last SDU of the message. The DataEnd TPI is attached to the last packet of the last SDU.

Figure 2:
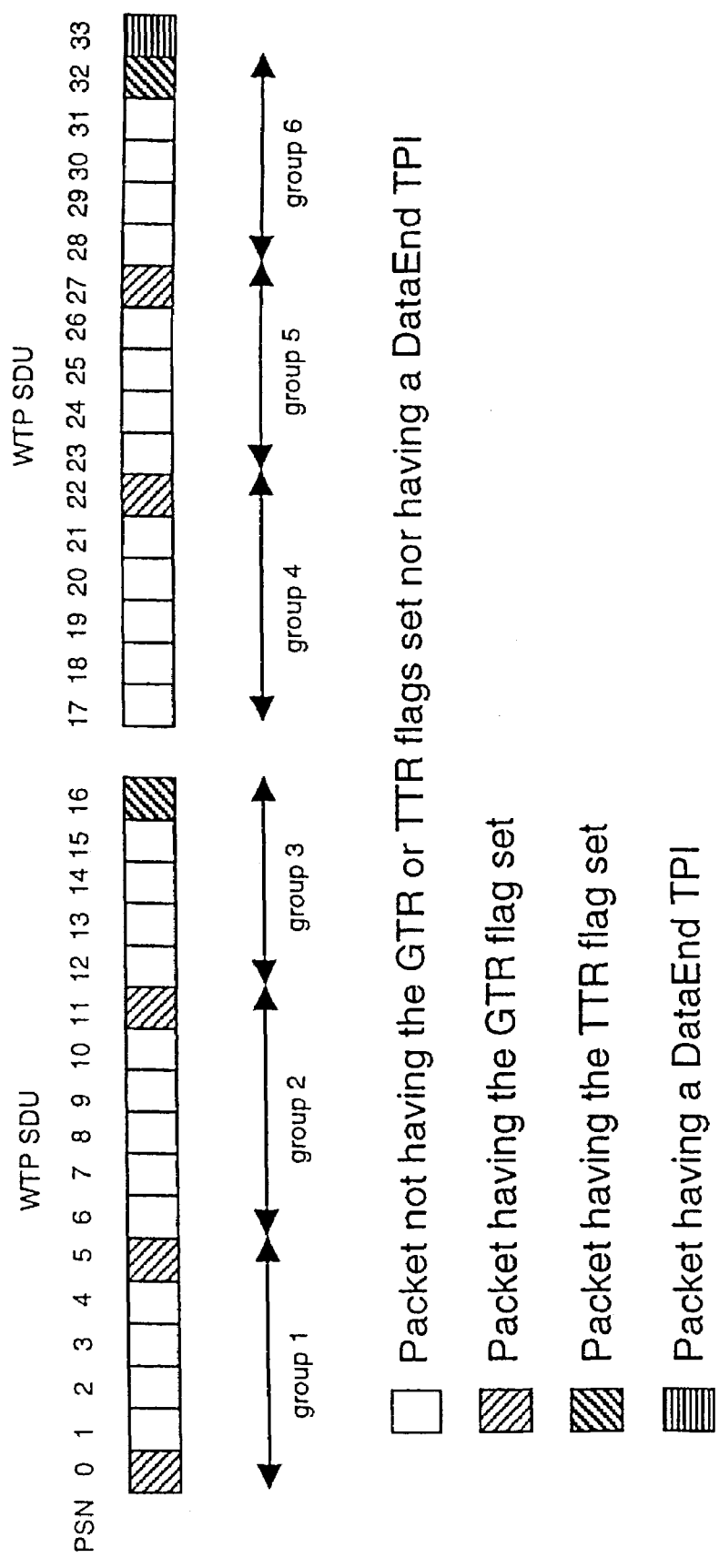
FIG. 2 shows the structure of a message.

The first packet generated from an Invoke message always carries the Invoke PDU header and it is assumed as having implicit PSN zero (as is shown in FIG. 2). If the Stream Invoke message is segmented the responder regards the Invoke PDU as packet number zero and waits for the following Segmented Stream Invoke PDUs. Additional packets are provided with a Segmented Stream Invoke header having sequentially increasing PSNs. In FIG. 2 packets 1 to 33 comprise this type of PDU. Such a PDU is as follows:

| Bit/Octet | 0 | 1 | 2 | 3 | 4 | 5 | 6 | 7 |
| --- | --- | --- | --- | --- | --- | --- | --- | --- |
| 1 | CON | PDU Type = Segmented Stream Invoke | | | | GTR | TTR | RID |
| 2 | TID | | | | | | | |
| 3 | | | | | | | | |
| 4 | PSN | | | | | | | |
| 5 | | | | | | | | |
| 6 | | | | | | | | |
| 7 | | | | | | | | |

The packets are transmitted in groups. Group transmission is discussed in further detail later. The packets are acknowledged in groups.

Irrespective of whether the Stream Invoke PDU is segmented, in class 3 transactions the PSN is kept both by the initiator and the responder. This is in order that the sender knows the next PSN (the PSN of the next packet) and that the receiver knows the PSN of the last acknowledged packet and thus knows the next expected packet (which is not necessarily the next received packet). If in the Stream Invoke service primitive the End-Of-Data flag is set, the message handler attaches a DataEnd TPI to the fixed part of the header of the PDU. If the Stream Invoke message is not segmented, its Invoke PDU carries the DataEnd TPI. If the Stream Invoke message is segmented the last segmented packet of the last message group carries the DataEnd TPI and the channel is closed.

The PSN wraps around and has a 32 bit field. This is in order to provide a greater time for data transmission so that there is a high probability that all packets in a data stream will have been received before the PSN has wrapped around completely and PSN numbers are re-used. The transaction may be long lived, so only the PSN (or occasionally the RID) will differentiate a new valid packet from duplicates of old packets.

The WTP provider (initiator) sends the Invoke PDU, starts a re-transmission timer and sets the re-transmission counter is set to zero. In addition, the WTP provider (initiator) initialises the PSN to zero and starts waiting for an acknowledgement from the WTP provider (responder). When the WTP provider (responder) receives the Invoke PDU with a valid TID, it acknowledges the Invoke message and delivers it to the WTP user (responder) by generating the TR-Stream Invoke indication service primitive.

If an acknowledgement of the Invoke PDU or any other packet has not been received by the sender when the re-transmission timer expires, that is the re-transmission interval has been reached, the re-transmission counter is incremented by one, the last packet of the group is re-transmitted and the re-transmission timer is re-started. For all re-transmissions the RID field is set. It is the only field which is changed. The WTP provider continues to re-transmit until the number of re-transmissions has exceeded the maximum re-transmission value. If no acknowledgement has been received by the time that the re-transmission counter is fully incremented and the timer expires, the transaction is terminated and the local WTP user is informed.

Assuming that the WTP provider (responder) receives the Invoke PDU, it acknowledges the first packet, that is the Invoke PDU, with a Stream Acknowledgement PDU, Stream Ack PDU. This is an Ack PDU carrying the Stream PSN TPI header with the PSN equal to 0. The WTP provider (responder) also sends its maximum group size in the form of an Option TPI (MaxGroupSize TPI) to indicate for the sender a group size window which is permitted. The group size is chosen by the sender so that it can fit the current network load and not be larger than the receiver window. The last window is valid until the next change of the window performed by the receiver appending a MaxGroupSize TPI to the acknowledgement of the last group. The receiver should choose a group size which is not too large for the optimal reaction for the network and load changes.

If the whole Stream Invoke message can be transmitted from the initiator to the responder in one datagram and so does not need to be segmented and re-assembled, it is sent as an Invoke PDU. This PDU is re-used even though there is no segmentation in order to minimise the number of PDUs which are required. Therefore, to indicate that it is last packet in a message, the TTR flag is set to 1 in its header.

The packets are sent and acknowledged in groups. If there is no need for segmentation to occur, a group will consist of a single packet. The packets in a packet group are sent in a single batch. Since the first group is sent without knowing the status of the receiver the number of packets should be one. Two alternative embodiments of a package transmission method are described below.

Transmission Method 1

This embodiment of the transmission method is not stop-and-wait. This means that there can be outstanding packet groups in that packets of a subsequent group may be sent before an acknowledgement has been received for a previous group.

The last packet of the group is the GTR packet. The GTR flag means that the sender requests an acknowledgement for all the packets sent in that group. The last packet of the entire message is the TTR packet.

In transmission method 1, if the GTR flag is set, the receiver has to send an acknowledgement (Ack PDU carrying the stream PSN TPI) having the PSN of the last packet of the last complete group received or a Stream Nack PDU with the list of PSNs between the last group which has been acknowledged and last packet which has been received. The Stream Nack PDU contains the PSNs of missing packets from the most recent group and may also contain PSNs of missing packets from earlier groups up to, but not including, the last group which has been acknowledged.

| GTR | TTR | Description |
| --- | --- | --- |
| 0 | 0 | This packet is not a last packet |
| 0 | 1 | This packet is the last of the message and an end of a group. Send acknowledgement. |
| 1 | 0 | Send acknowledgement (this packet is the end of a group) |
| 1 | 1 | Reserved. |

Each last packet of a message (SDU) is an end of a group and is to be acknowledged. TTR is also a request for an acknowledgement.

The PSN included in the Stream PSN TPI is the PSN of the acknowledged packet (GTR packet). This acknowledgement is cumulative inside the group in that it acknowledges that all packets in the group arrived but does not mean that all other previous packets outside in this group received.

Messages are sent in order. Transmission of a new message is not started before transmission of a previous message has ended. When the receiver receives a packet which is not a GTR packet, it stores the packet and waits for a new packet. When the receiver has received all packets of a message (that is the last packet is the TTR packet), it should be able to re-assemble the complete message. When the receiver receives the GTR packet, it checks whether it has received all packets belonging to that packet group. If this is the case, the receiver sends a Stream Ack PDU (carrying Stream PSN TPI in which PSN is set equal to the PSN of the GTR packet) to the sender. When the GTR packet set has been received and one or more packets of the group are missing, the WTP provider waits for a period of time, such as half of the median round-trip, before returning the Stream Nack PDU with a list of the missing packets. If the status of the group changes during the time, that is one of the missing packets is, in fact, received, the waiting time is reset. The Stream Nack PDU is used exclusively in class 3 transaction for indication of erroneous reception of the group data. It is shown below:

| Bit/Octet | 0 | 1 | 2 | 3 | 4 | 5 | 6 | 7 |
| --- | --- | --- | --- | --- | --- | --- | --- | --- |
| 1 | | CON | PDU Type = Stream NAck | | | Reserved | | RID |
| 2 | TID | | | | | | | |
| 3 | | | | | | | | |
| 4 | | | Number of Missing Packets = M | | | | | |
| 5 | | | PSN(s) of Missing Packets | | | | | |
| ... | | | | | | | | |

The Stream Nack PDU may list other missing packets belonging to other groups. In this way, if a current Stream Nack PDU is received but a previous Stream Nack PDU has been lost, it is not necessary for the sender to have to re-transmit the last unacknowledged GTR packet and wait for the receiver to re-transmit the previously lost Stream Nack PDU. This can be explained as follows. Suppose that there are some missing packets in a first group and some missing packets in a second group. The receiver sends a first Stream Nack PDU for the first group and a second Stream Nack PDU for the second group. If the first Stream Nack PDU is lost, the sender does not know what is the status of the first group. Therefore, if the missing packets of the first group are included in the second Stream Nack PDU, this avoids the need for a full round-trip and associated re-transmission time. The sender re-transmits the missing packets with the original PSN but with the RID flag set. When the receiver has received the complete packet group, including those that were re-transmitted, it acknowledges the GTR packet.

The size of the first group may be a default dependent on the bearer. In the Stream Ack PDU, following transmission of the first packet group, the receiver may send its MaxGroupSize to indicate its current window packet space. A window packet space is defined which is the number of packets which can be outstanding at any one time. This window packet space is present in both the sender and in the receiver.

After this initial procedure the receiver can control the data flow with its window packet space. One way in which this is done is to change the group size during transmission of a single message. The available window packet space is measured in bytes. The maximum number of packets in one group is determined by the maximum bearer packet size. The maximum number of transmittable packets in a group is determined by the number of available data buffers at the receiver.

The window packet space is mapped into a PSN space, that is a range of PSNs starting with the PSN of the longest outstanding packet (that is the packet that has been non-acknowledged for the longest time) and extending to a PSN equal to the PSN of the longest outstanding packet plus the number of packets in the window packet space. If a particular group is acknowledged, although this means that all packets belonging to that particular group have been received, it does not necessarily mean that packets in groups transmitted either before or after that particular group have been received. If a group acknowledgement arrives, and all other packets in the receiver PSN space having PSNs less than its PSN have been received, the window is adjusted so that it begins at the new longest outstanding packet in order to re-define the PSN space. In this way the PSN space can move incrementally, even by its beginning and end PSNs moving by one, rather than moving in jumps corresponding to the window packet space.

As packets are sent by the sender and received by the receiver, delays in packet transmission may lead to outstanding packets. Assuming that these outstanding packets are received, as each longest outstanding packet is received, the receiver sends an acknowledgement to the sender of receipt of the longest outstanding packet and moves its window packet space to occupy the next PSN space. The PSN space thus now begins at the new longest outstanding packet. When the sender receives the acknowledgement, it moves its window packet space correspondingly so that the window packet spaces of the sender and of the receiver correspond.

The sender should not create a group having larger number of packets than the window packet space.

If the sender has not received an acknowledgement when the re-transmission timer expires, only the GTR packet is re-transmitted, rather than the entire packet group.

If in the Stream Nack PDU the Number of Missing Packets parameter has value zero, all packets in the group have to be re-transmitted.

The receiver may close its window by sending MaxGroupSize TPI equal to 0 with an acknowledgement because it has no more buffer space to receive data. However, the receiver still has to reserve one packet buffer to receive a possible Abort. In order to provoke the receiver into giving information concerning its window, the sender sends a one-packet group (a GTR packet) even though the window is closed. The receiver sends an acknowledgement in response indicating the current status of the window. The window may not still be closed. When the window becomes open again, the receiver repeats the acknowledgement of the last packet group. The acknowledgement carries the MaxGroupSize TPI with the new available window size (perhaps other than 0). However, the sender may not receive the acknowledgement regarding the open window. This may be because the acknowledgement has been lost, it has been sent but not yet received or it has not yet even been sent. If the sender does not receive an acknowledgement, a re-transmission timer is used in a conventional way to control any re-transmissions which are necessary. In any case, sender is informed about resource problems in the receiver and so the re-transmission timer is larger than normal.

Transmission Method 2

This embodiment of the transmission method is stop-and-wait. This means that there cannot be outstanding packet groups. The GTR packet for a subsequent group is only sent when an acknowledgement has been received for all of the packets of a previous group. Details of the scheme for shifting along the window packet space on acknowledgements being received corresponds to that described above.

The last packet of a group is the GTR packet. The last packet of the last packet group of an entire message is the TTR packet. In transmission method 2 the GTR and the TTR flags have the same meanings as are described in the WAP Wireless Transaction Protocol Specification.

When the receiver receives a packet which is neither a GTR packet nor a TTR packet, it stores the packet and waits for a new one. When the receiver has received a complete packet group and the last packet is a TTR packet, it should be able to re-assemble the complete message. When the receiver receives either a GTR or a TTR packet, and all packets in the group have been received successfully, it sends an Ack PDU (carrying Stream PSN TPI) to the sender. When either a GTR or a TTR packet has been received and one or more packets of the group are missing, the WTP provider waits a period of time, such as half the median round-trip, before returning the Stream Nack PDU with details of the missing packets. If the status of the group changes during the time, that is one of the missing packets is, in fact, received, the waiting time is reset.

When the receiver receives either a GTR or a TTR packet, it checks whether it has received all packets belonging to that packet group. If the complete packet group has been received the receiver returns a Stream Ack PDU with the attached Stream PSN TPI header in which PSN is equal to the packet sequence number of the GTR or the TTR packet. The PSN included in the Stream PSN TPI is the PSN of the acknowledged packet (GTR or TTR packet). This acknowledgement is cumulative, it acknowledges that all previously transmitted packets are received.

If one or more packets are missing, the receiver answers with Stream Nack PDU, and the missing packets are listed in the Stream Nack PDU. The missing packets are re-transmitted with the original PSN but with the RID flag set. When the receiver has received the complete packet group, including those that were re-transmitted, it acknowledges the GTR or the TTR packet.

If the sender has not received an acknowledgement when the re-transmission timer expires, only the GTR or the TTR packet is re-transmitted, rather than the entire packet group.

If in the Stream Nack PDU the Number of Missing Packets parameter has value zero, all packets in the group are re-transmitted.

For improving throughput in this transmission method the following features are included:

1. During transmission of a group, the receiver may send the Stream Nack PDU without waiting for the GTR or the TTR packet, if it identifies that it missed some packets in the sequence. Therefore, if a first Stream Nack PDU concerning a particular packet is sent before the GTR or TTR packet has been received and the particular packet is still not received after the GTR or TTR packet has been received, then the particular packet will be indicated in a second Stream Nack PDU, and thus will be indicated as missing in both of the Stream Nack PDUs.
2. The group size is chosen to be half of the numerical value of the group window size. In the case of the group window size being an odd number the group size is ((group window size)−1)/2. Determining the group size occurs by the receiver indicating its window size by the MaxGroupSize TPI and the sender selecting an appropriate group size. Operation of this transmission system will be demonstrated by the following example. Let us assume that the window size is 11. Accordingly, the group size will be 5.

There are four packets to be transmitted. In a first transmission burst, packets 0, 1, 2, 3, 4 (GTR packet of first group), 5, 6, 7, and 8 are sent. This first transmission burst is the whole of the first group and part of the second group. The GTR packet of the second group is not sent in this transmission burst. In a second transmission burst, the first packet to be sent is the GTR packet of the second group followed by part of the third group. The GTR packet of the third group is not sent in this transmission burst. In subsequent transmission bursts, the first packet is the GTR packet of an old group from a preceding transmission burst and the packets of a new group excluding the GTR packet of the new group. As each GTR packet is received, if all of the packets from its group have been received, an acknowledgement of that group is sent and the next transmission burst occurs. Only one GTR/TTR packet can be outstanding at any time. In providing this transmission method, the receiver needs to be able to store an incomplete sequence of packets from one group and a subsequent transmission burst and to re-assemble the groups. It is necessary for the receiver to be able to handle two packet groups having overlapping transmissions. Missing packets will be listed in a Stream Nack PDU and then re-transmitted. In the meantime, packets of the next group may already have been transmitted and may be waiting to be re-assembled in the receiver buffers.

In this case of both transmission method 1 and transmission method 2, TTR implicitly marks the end of a group.

After the message containing the DataEnd TPI has been acknowledged no more data messages can be sent to the receiver.

The message is re-assembled in the WTP provider (responder). Once it has been re-assembled, the WTP provider (responder) invokes service primitive TR-Stream Invoke.ind in the WTP user (responder) and the WTP user receives the message and responds by invoking the service primitive TR-Stream Invoke.res in the WTP provider (responder).

In the class 2 transactions, a single Invoke message can be acknowledged by a single Result message without an Ack message being sent and received. This is implicit acknowledgement. In class 3 there may be many packets and many packet groups which relate to the same transaction and the transaction can proceed for a long time. Therefore, receipt of a Stream Result message does not implicitly acknowledge a particular Invoke message because it could relate to a number of different Invoke messages. This is because the Stream Result message does not contain the PSN or PSNs of the related Invoke message Furthermore, timing is important. The PDUs sent on a channel are not (necessarily) sent as an answer to each other. Individual acknowledgements are provided for individual packets, that is specific acknowledgements for GTR packets and implicit acknowledgements for non-GTR packets.

User acknowledgement functionality is provided in class 3. When it is set (in the Stream Invoke service primitive by the WTP user and in the Invoke PDU by the WTP provider), all messages are not acknowledged by the receiving WTP provider automatically, but are sent to an upper layer to respond for the message. When the upper layer has responded, the WTP provider sends the acknowledgement to the WTP provider which sent the message.

As mentioned above, FIG. 1 only shows the messages being transmitted on the input channel during the transaction. In the output channel the transaction occurs in a similar manner. After the responder has received the class 3 Stream Invoke PDU, and acknowledged it, the Stream Invoke PDU is passed upwards to be dealt with by a layer or layers above the WTP provider (responder). A Result message is handled on the same way as the Invoke message. Upon assembling the data, the WTP user (responder) sends the Result message by initiating the TR-Stream Result request primitive in the WTP provider (responder). This TR-Stream Result primitive is used to send the result of a Stream Invoke message in a class 3 transaction. It has the parameters given in the table below:

| | Primitive TR-Stream Result | | | |
| --- | --- | --- | --- | --- |
| Parameter | req | ind | res | cnf |
| User-Data | O | C(=) | | |
| End-Of-Data | M | C(=) | O | |
| Exit info | | | O | C(=) |
| Handle | M | M | M | M |

The Result message is transmitted to the initiator using Result PDU. Depending on its size it is either segmented or it is not. When the Result PDU has been sent, the responder starts a re-transmission timer and waits for acknowledgement from the initiator. After the Result PDU is received by the initiator, the WTP provider (initiator) forwards up the TR-Result indication primitive to the WTP user (initiator).

After the message containing the DataEnd TPI is acknowledged the transaction ends.

After the last acknowledgement is sent by the receiver of the last group of the last message, the sender and the receiver both have to wait before clearing their respective administrations concerning the channel. This is so that the sender can re-transmit the last group if it does not receive an acknowledgement and the receiver can know that the sender received the acknowledgement.

Figure 4:
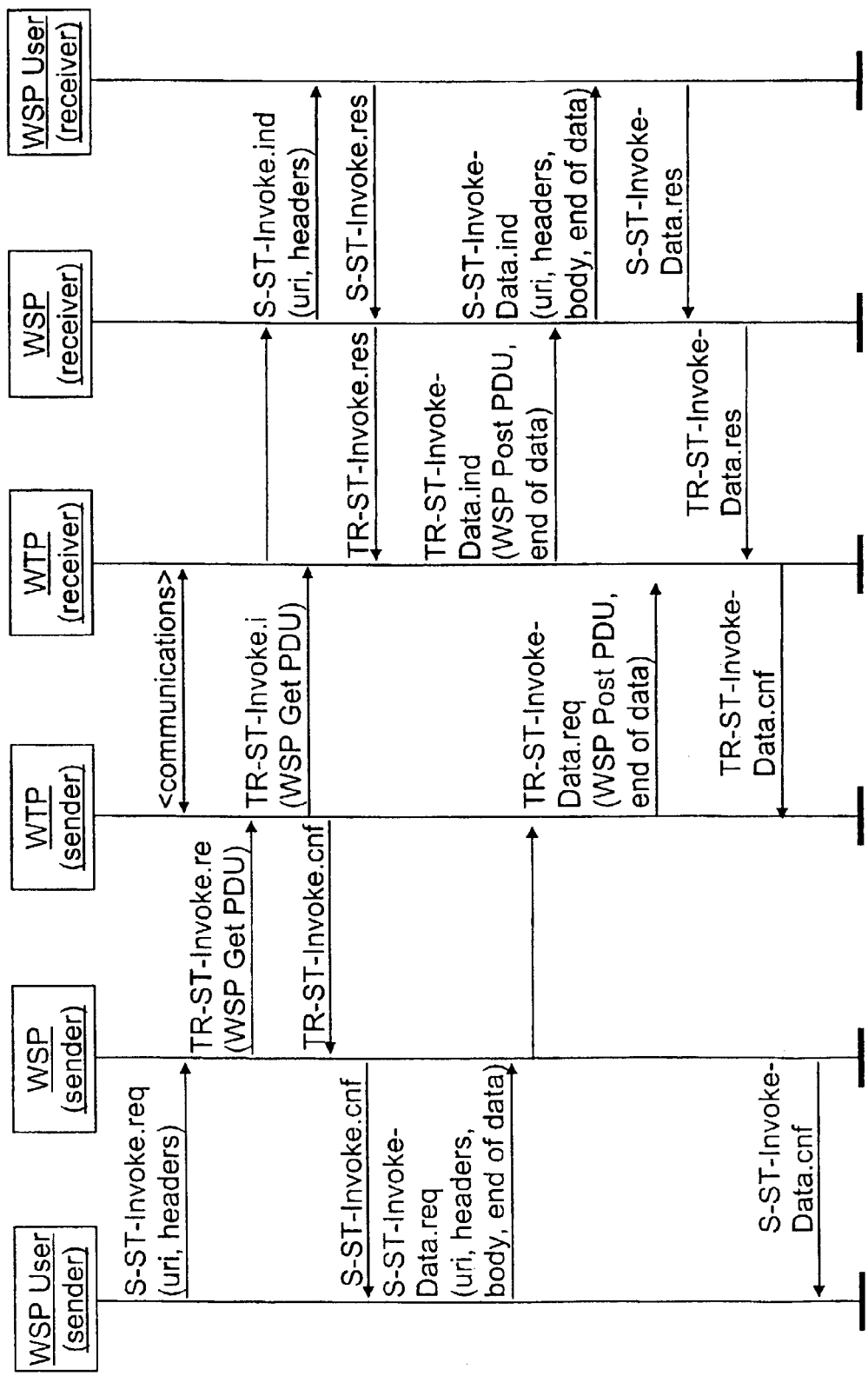
FIG. 4 shows another view of the transaction of FIG. 3.

FIG. 4 shows part of a class 3 transaction in which data is transmitted in expanded form. In common with FIG. 1, only communication over the input channel is shown. FIG. 4 shows initiation of a class 3 transaction in which the Stream Invoke message size does not exceed the MTU for the network and segmentation is not used. The WTP user (responder) invokes the service primitive TR-Stream Invoke.req in the WTP provider (responder). If the End-Of-Data parameter is not set in the TR-Stream Invoke request primitive, the initiator must issue at least one more TR-Stream Invoke Data service primitive. These are discussed below. Since the message is not segmented into additional packets, the WTP provider (initiator) sends an Invoke PDU containing the whole message to the WTP provider (responder) and the WTP provider (responder) invokes a service primitive TR-Stream Invoke.ind in the WTP user (responder). When the WTP user (responder) has received the message, it invokes a service primitive TR-Stream Invoke.res in the WTP provider (responder). The WTP provider (responder) sends a Stream Ack having a PSN of 0 to the WTP provider (initiator) which results in the WTP provider (initiator) invoking a service primitive TR-Stream Invoke.cnf in the WTP user (initiator). The Stream Ack carries the MaxGroupSize TPI.

Figure 3:
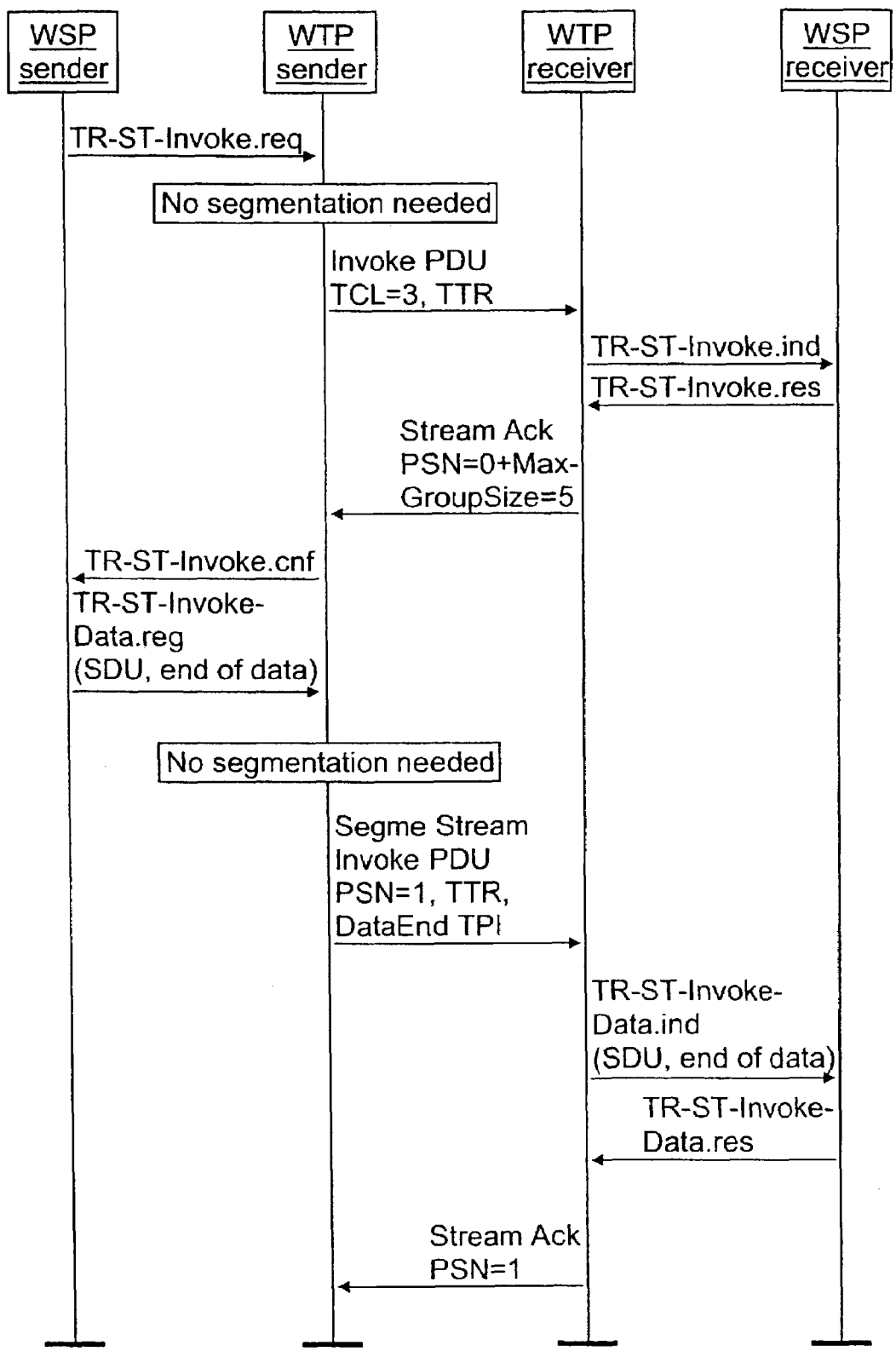
FIG. 3 shows a transaction in which segmentation is not used.

In the case of FIG. 3, the initiator then decides to send more data to the responder within the same transaction. The WTP user (initiator) invokes a TR-Stream Invoke Data.req service primitive in the WTP provider (initiator) to send additional data. The parameters of the TR-Stream Invoke Data (Stream Invoke Data) service primitive are shown below. This primitive is used to continue the data of a Stream Invoke message in a class 3 transaction.

|            | Primitive TR-Stream Invoke Data | | | |
|------------|-----|-------|-----|-----|
| Parameter  | req | ind   | res | cnf |
| User-Data  | O   | C(=)  |     |     |
| End-Of-Data| M   | C(=)  |     |     |
| Handle     | M   | M     | M   | M   |

Again, the Stream Invoke message size does not exceed the MTU for the network and so the message is not segmented into additional packets. The WTP provider (initiator) sends a Segmented Stream Invoke PDU to the WTP provider (responder). This PDU has a PSN of 1 because it is the next packet in the transaction and the TTR flag is set to indicate that it is the last packet in this message and to indicate that an acknowledgement has been requested. The WTP provider (initiator) sends the DataEnd TPI attached to the fixed part of the header of the Segmented Stream Invoke PDU to the WTP provider (responder). The WTP provider (responder) invokes a service primitive TR-Stream Invoke Data.ind in the WTP user (responder).

The WTP user (responder) responds by invoking the service primitive TR-Stream Invoke Data.res in the WTP provider (responder) when it has received the Invoke message. The WTP provider (responder) sends a Stream Ack PDU with Stream PSN TPI attached having a PSN of 1 to the WTP provider (initiator). The WTP provider (initiator) invokes the service primitive TR-Stream Invoke Data.cnf in the WTP user (initiator).

Once the initiator has no more data to send, the End-Of-Data flag is set in the TR-Stream Invoke Data service primitive.

If the initiator sends several more data message started with TR-Stream Invoke Data service primitives, they will also be provided by the Segmented Stream Invoke header whether or not the message is segmented. If it is necessary, the message is segmented. The Segmented Stream Invoke PDU is used in every case when class 3 transaction additional data is sent to the responder after a Stream Invoke message. If there is no need for segmentation of the message, this PDU will be the last packet of a one-packet message group.

In case of the last data message the DataEnd TPI is attached to the fixed part of the header of the last Segmented Stream Invoke PDU. The End-Of-Data parameter is included in the Stream Invoke and Stream Invoke Data service primitives when that message is the last message of the message stream. The service primitive parameter will be set, and therefore the local WTP will attach the DataEnd TPI to the last PDU of this last message.

Once the responder has obtained data in response to the Invoke message, the WTP user (responder) sends a Result message by initiating the TR-Stream Result request service primitive in the WTP provider (responder). Depending on the nature of the Result message, it may either be sent as a single message or segmented. The first packet generated from a Stream Result message always carries the Result PDU header and it is assumed as having implicit packet number zero. If the Result message needs to be segmented, it is sent in additional Segmented Stream Result PDUs.

| Bit/Octet | 0 | 1 | 2 | 3 | 4 | 5 | 6 | 7 |
|-----------|---|---|---|---|---|---|---|---|
| 1 | CON | PDU Type = Segmented Stream Result | | | | GTR | TTR | RID |
| 2 | TID | | | | | | | |
| 3 | | | | | | | | |
| 4 | PSN | | | | | | | |
| 5 | | | | | | | | |
| 6 | | | | | | | | |
| 7 | | | | | | | | |

If it is desired for the WTP user (responder) to send further blocks of data, this can be achieved by issuing TR-Stream Result Data service primitives. These cause a number of Stream Result Data messages to be sent. This TR-Stream Result Data service primitive is shown in the table below:

|            | Primitive TR-Stream Result Data | | | |
|------------|-----|-------|-----|-----|
| Parameter  | req | ind   | res | cnf |
| User-Data  | O   | C(=)  |     |     |
| End-Of-Data| M   | C(=)  |     |     |
| Exit info  |     |       | O   | C(=)|
| Handle     | M   | M     | M   | M   |

This service primitive generates a Segmented Stream Result PDU even if there is no need for the segmentation of the message. In this case, this PDU will be the first and last packet of the message and the TTR flag will be set.

After posting a Stream Invoke or Stream Result message the PSN counter will not be cleared until the end of the data transmission.

During the transaction the initiator and the responder may each transmit a number of blocks of data as required using separate Stream Invoke Data and Stream Result Data messages until the transaction is ended.

Once the responder has no more data to send, it closes its side of the transaction by setting the End-Of-Data parameter setting either in the TR-Stream Result or in the TR-Stream Result Data service primitives issued invoked by the WTP user (responder) in the WTP provider (responder) and sending the End-Of-Data message (message with attached DataEnd TPI header). If the End-Of-Data parameter is not set in the TR-Stream Result request primitive, the Responder has to issue at least one more TR-Stream Result Data service primitive. However ending of the channel by the responder is not necessarily the end of the transaction because the responder can receive additional data from the initiator until it receives the initiator's End-Of-Data message. The transaction is terminated if both the initiator and the responder send their End-Of-Data messages. In any case, a transaction can be aborted at any time by either of the parties invoking the Transaction Abort service primitive. This service primitive is defined in the Wireless Transaction Protocol Specification.

The last Ack PDU is sent when the last message of the channel has been received. The sender of the acknowledgement must maintain state information in order to be able to handle a re-transmission of the previous group (for example if the acknowledgement becomes lost). The state information can be maintained by using a wait timer.

The received and re-assembled message is transferred to a level above the WTP provider, that is to the WTP user or elsewhere, having a size equal to the sent message.

Unlike the transaction classes, 1 and 2, defined by the WAP standard, in class 3 transactions, all messages are acknowledged by explicit Stream Ack PDUs to indicate that the particular message has been received. The expanded data transfer can be overlapped, that is the two channels can work in parallel, until the DataEnd TPI is received. In effect this means that Stream Invoke Data PDUs can go in one direction at the same time as Stream Result Data PDUs can go in the opposite direction.

The WTP provider (initiator) is able to initiate multiple transactions before the result of an earlier transaction is received. The transactions can be handled asynchronously in which responses to later transactions are received before responses to earlier transactions.

The variable part of a fixed header of a PDU can consist of one or several TPIs. The length of a TPI can be 2 or 8 bits.

| TPI | TPI Identity | Comment |
|---|---|---|
| Error | 0x00 | |
| Info | 0x01 | |
| Option | 0x02 | |
| Packet Sequence Number | 0x03 | Note 1 |
| DataEnd | 0x04 | Note 2 |
| Stream Packet Sequence Number | 0x05 | Note 2 |

Note 1 This TPI is only applicable if the segmentation and re-assembly is used to segment and re-assemble a message.
Note 2 This TPI is used only in class 3 transactions.

The Error TPI is returned to the sender of an erroneous or unsupported TPI. The Info TPI is used to piggyback a small amount of data in the variable part of the PDU header, for example performance measurements or statistical data. The Option TPI is used to transfer parameters between two WTP entities. It should be noted that unlike the Wireless Transport Protocol Specification, either party in a transaction may give out the Maximum Group Option TPI in any Ack PDU at any time and it should be valid until the next same type of TPI or the end of the transaction. The DataEnd TPI may be attached to the following PDUs:
    Invoke PDU
    Result PDU
    Segmented Stream Invoke PDU
    Segmented Stream Result PDU The meaning of the DataEnd TPI is that there will not be any more data transmission from this direction to the other party of the transaction. Therefore, this is the last numbered packet from this direction. If the End-Of-Data flag parameter of any of the TR-Stream Invoke, TR-Stream Result, TR-Stream Invoke Data or TR-Stream Result Data service primitive is set, the last packet of the last message group will carry this DataEnd TPI. Its structure is as follows:

| Bit/Octet | 0 | 1 | 2 | 3 | 4 | 5 | 6 | 7 |
|---|---|---|---|---|---|---|---|---|
| 1 | CON | TPI Identity = DataEnd | | | 0 | PTI Length = 0 | | |

In Class 3 transactions, the Ack PDU does not have a Packet Sequence Number field and the Stream Packet Sequence Number TPI is used as an attachment to the variable part of the Ack PDU header. The TPI differs for the two transmission methods referred to above. In transmission method 1, the PSN included in the Ack PDU is the PSN of the acknowledged packet (GTR packet). This acknowledgement is cumulative inside the group; it acknowledges that all packets in the group arrived but does not indicate that all previous packets outside in this group have been received. In transmission method 2, the PSN included in the Ack PDU is the PSN of the acknowledged packet (GTR or TTR packet).

| Bit/Octet | 0 | 1 | 2 | 3 | 4 | 5 | 6 | 7 |
|---|---|---|---|---|---|---|---|---|
| 1 | CON | TPI Identity Stream Packet Sequence Number | | | 0 | PTI Length = 4 | | |
| 2 | Packet Sequence Number | | | | | | | |
| 3 | | | | | | | | |
| 4 | | | | | | | | |
| 5 | | | | | | | | |

FIG. 5 shows a table of valid primitive sequences. In any one column, the service primitives which heads the column may only be followed by the corresponding service primitives in the rows that are marked with an X. End-Of-Data indicates the flag set in the service primitive. This table shows only globally the allowed sequence of the primitives.

The steps involved in using a class 3 transaction on the level of the WSP layer will now be described. FIG. 4 shows the Stream Invoke transaction of FIG. 3 at a higher level so as to show the involvement of session layers in a sender and in a receiver. FIG. 4 shows the session layer service primitives invoked by a WSP user in a WSP provider in each of the sender and the receiver.

The S-Stream Method Invoke primitive is used to request an operation to be executed by the server. It can be used only together with the S-Method Result service primitive.

| | Primitive S-Stream Method Invoke | | | |
|---|---|---|---|---|
| Parameter | req | ind | Res | cnf |
| Client Transaction Id | M | — | | M(=) |
| Server Transaction Id | — | M | M(=) | |
| Method | M | M(=) | | |
| Request URI | M | M(=) | | |
| Request Headers | O | C(=) | | |
| Request Body | C | C(=) | | |
| End-Of-Data | M | M(=) | | C(=) |

The End-Of-Data flag indicates whether there will be any more data (continuation of the Request Body). If it is set, this is all of the data which has been sent by the Stream Invoke message.

The S-Stream Invoke Data service primitive is used to send the continuation of the Request Body of the started operational request to the server. It can be invoked only after a preceding S-Stream Method Invoke primitive has occurred having its End-Of-Data flag clear.

| | Primitive S-Stream Invoke Data | | | |
|---|---|---|---|---|
| Parameter | req | ind | res | cnf |
| Client Transaction Id | M | | | M(=) |
| Server Transaction Id | | M | M(=) | |

-continued

| | Primitive S-Stream Invoke Data | | | |
|---|---|---|---|---|
| Parameter | req | ind | res | cnf |
| Method | M | M(=) | | |
| Request URI | O | O(=) | | |
| Request Headers | O | C(=) | | |
| Request Body | C | C(=) | | |
| End-Of-Data | M | M(=) | | |

The End-Of-Data flag indicates whether there will be any more data (continuation of the Request Body). If it is set, this is the last data which has been sent.

The S-Stream Result service primitive is used to return a response to an operational request. It can be invoked only after a preceding S-Stream Method Invoke primitive has occurred.

| | Primitive S-Stream Result | | | |
|---|---|---|---|---|
| Parameter | req | ind | res | cnf |
| Server Transaction Id | M | — | | M(=) |
| Client Transaction Id | — | M | M(=) | |
| Status | M | M(=) | | |
| Response Headers | O | C(=) | | |
| Response Body | C | C(=) | | |
| Acknowledgement Headers | — | — | OC | P(=) |
| End-Of-Data | M | M(=) | | C(=) |

The End-Of-Data flag indicates whether there will be any more data (continuation of the Response Body). If it is set, this is the all of the data which has been sent in this Stream Result message.

The S-Stream Result Data primitive is used to return additional response data to an operational request. It can be invoked only after a preceding S-Stream Invoke primitive has occurred.

| | Primitive S-Stream Result Data | | | |
|---|---|---|---|---|
| Parameter | req | ind | res | cnf |
| Server Transaction Id | M | — | | M(=) |
| Client Transaction Id | — | M | M(=) | |
| Status | M | M(=) | | |
| Response Headers | O | C(=) | | |
| Response Body | C | C(=) | | |
| Acknowledgement Headers | — | — | OC | P(=) |
| End-Of-Data | M | M(=) | | C(=) |

The End-Of-Data flag indicates whether there will be any more data (continuation of the Response Body). If it is set, this is all of the data which has been sent.

In the S-Stream Method Invoke facility, the following PDUs are used: Get, Post and Reply. These PDUs are defined in the WAP standard.

An example of another transaction is a Stream Push transaction. This Stream Push transaction also utilises the class 3 WTP transaction but the server takes the role of the initiator. In contrast to the Stream Invoke transaction, the Stream Push transaction is one-way only. The server initiates the transaction and the client is the responder. Large amounts of data can be pushed in any of the forms of data stream discussed above. The responder channel will be closed automatically since only the server sends data to the client.

Services primitives used in the Stream Push transaction are defined below:

| | S-Stream Push | | | |
|---|---|---|---|---|
| | | Primitive S-Stream Push | | |
| Parameter | req | ind | res | cnf |
| Server Transaction Id | M | — | | M(=) |
| Client Transaction Id | — | M | M(=) | |
| Response Headers | O | C(=) | | |
| Response Body | C | C(=) | | |
| Acknowledgement Headers | — | — | O | P(=) |
| End-Of-Data | M | M(=) | | |

| | S-Stream Push Data | | | |
|---|---|---|---|---|
| | | Primitive S-Stream Push Data | | |
| Parameter | req | ind | res | cnf |
| Server Transaction Id | M | — | | M(=) |
| Client Transaction Id | — | M | M(=) | |
| Response Headers | O | C(=) | | |
| Response Body | C | C(=) | | |
| Acknowledgement Headers | — | — | O | P(=) |
| End-Of-Data | M | M(=) | | |

In the S-Stream Push facility, the PDUs Confirmed push PDU as defined in the WAP standard is used.

In order to provide these optional facilities, Push, Confirmed push, Suspend and Resume and Acknowledgement headers, changes have to be made to WSP. In particular, two protocol options flags have to be added and two more capabilities, Maximum Outstanding Stream Method Request and Maximum Outstanding Stream Push Request are introduced.

It is possible for the initiator to send a first Invoke message and then send a second Invoke message (that is a Stream Invoke message) before the first Invoke message has been received by the responder. The responder would note that the Invoke message it receives first would have a new TID but may not correctly start a transaction. In this case, the responder stores the second Invoke message rather than discarding it and waits for the Invoke message.

Concatenation of several PDUs in class 3 transaction may also be provided. It uses the same rules as concatenation for the other classes as defined by the WAP standard.

The invention can be incorporated into a mobile terminal, a WAP protocol stack, a WAP server or a WAP gateway.

Figure 6:
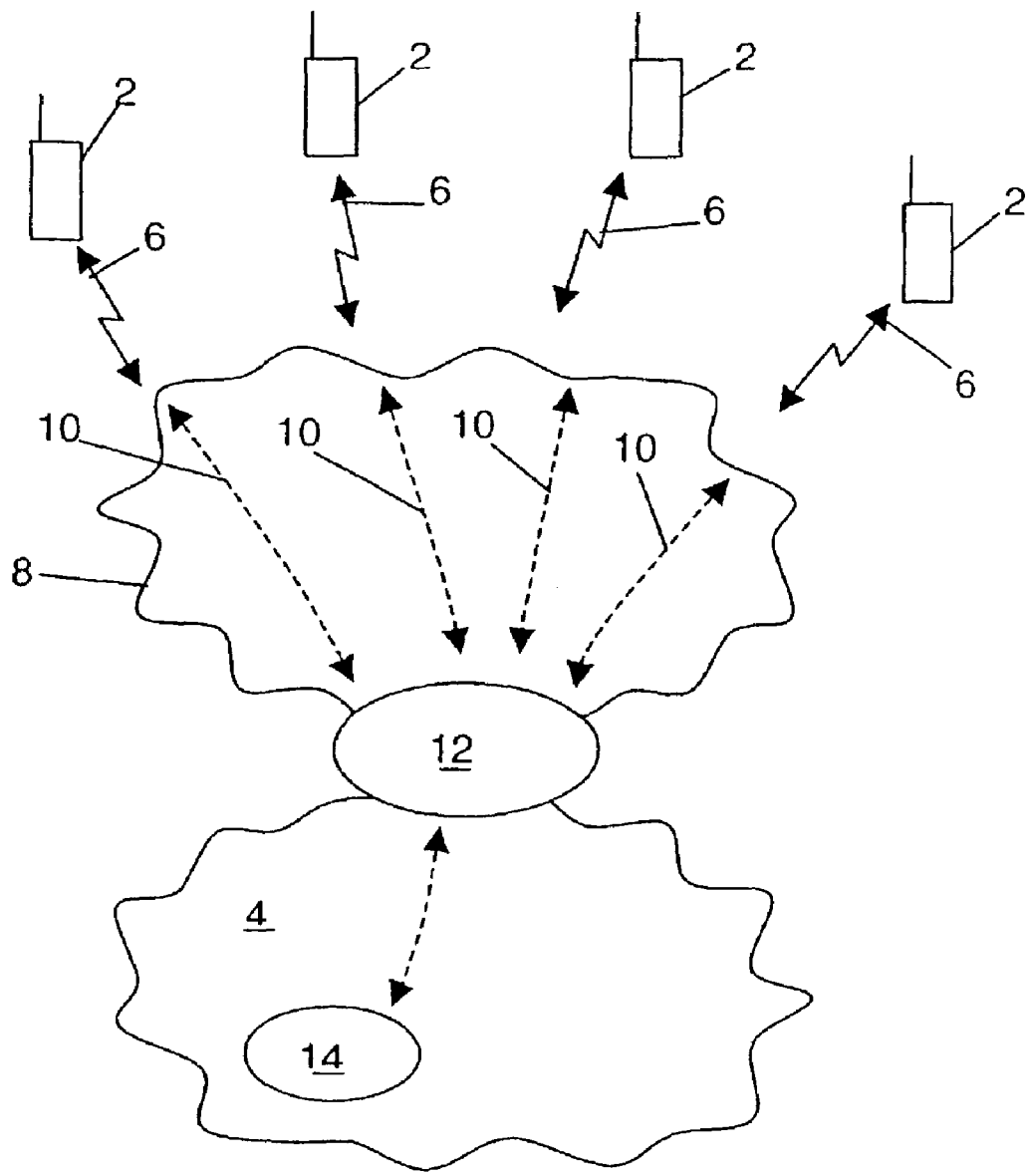
FIG. 6 shows a communication system.

FIG. 6 shows a communication system comprising a plurality of mobile terminals 2 having access to the Internet 4. The mobile terminals transmit signals 6 which are received by and transmitted through a wireless network 8. The signals comprise wireless mark-up language (WML) and WAP commands according to WAP. WML is a tag-based display language providing navigational support, data input, hyperlinks, text and image presentation and forms. It is a browsing language similar to HMTL. Signals 10 received by the network 8 are routed to a proxy or gateway server 12. The server 12 translates WAP requests into HTTP requests and thus allows the mobile terminals 2 to request information from a web server 14 and thus browse the Internet 4. Information obtained from the web server 14 is encoded by the gateway into a suitable format and then transmitted by the wireless network to the mobile terminal 2 which requested it. The mobile terminal 2 processes and uses the information. If the web server 14 provides content in WAP/WML format, the server 12 can retrieve such content directly from the web server 14. However, if the web server provides content in WWW format (such as HTML), a filter may be used to translate the content from WWW format to WAP/WML format.

Although FIG. 6 shows information being obtained from the Internet, the gateway itself may contain the desired information. For example, the client may retrieve information from the file system of the gateway.

Figure 7:
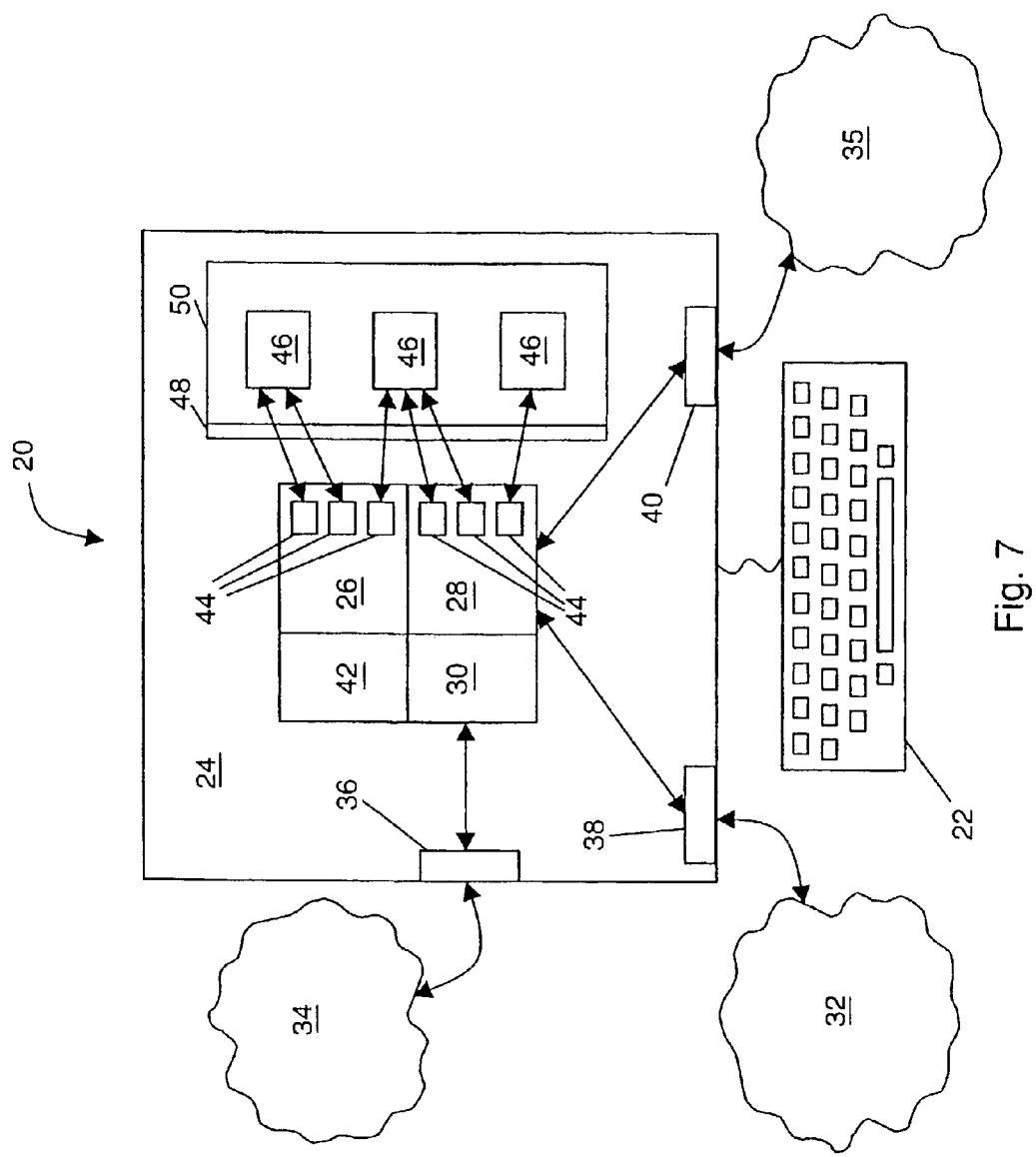
FIG. 7 shows a gateway.

FIG. 7 shows a gateway server embodied in hardware such as a computer 20. The computer 20 has dynamic memory, processing power and memory to store all of the programs needed to implement the gateway server such as the application program, the protocol stacks and the operating system. The computer 20 comprises a user interface such as a keyboard 22 and a display (not shown) and a server program 24. The server program 24 has an application program 26 for processing events of the underlying protocol, such as handling a request to retrieve WML from a server, and protocol stacks such as a WAP protocol stack 28 and a HTTP protocol stack 30. The application program 26 controls flow of data, including commands, requests and information, between the computer and various networks including a telephone network 32, the Internet 34 and a data network and circuit switched data networks 35. The computer 20 communicates with the Internet 34 through the HTTP protocol stack 30 and an interface 36. The computer 20 communicates with the telephone network 34 and the data network 35 through interfaces 38 and 40. The server program 24 also comprises an application 42 which converts between HTTP and WAP. SMS messaging may be provided via a data connection through appropriate hardware to the operator's network.

Individual threads 44 present in the application program 26 and the WAP protocol stack 28 use processors 46 in the computer 20 to carry out necessary processing tasks. Allocation of threads to processors is provided by threading services 48 present within the operating system 50 of the computer 20.

The WAP stack is built on top of so-called bearers (which provide datagram services). These bearers can be, for example, SMS or CSD. The bearers have their own protocol and are implemented through protocol stack implementations.

Figure 8:
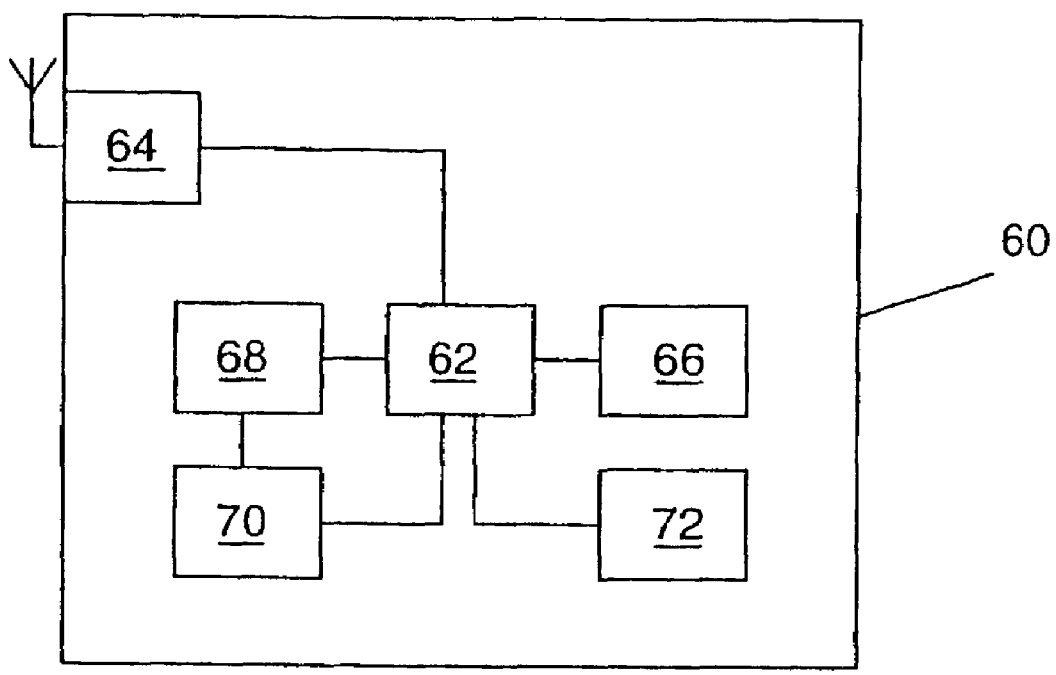
FIG. 8 shows a mobile terminal.

FIG. 8 shows an embodiment of a mobile terminal 60. The mobile terminal 60 comprises a central processing unit (CPU) 62, a transceiver 64, a memory 66 for storing content, a WAP micro-browser and associated protocols 68 to control the transfer of data over the transceiver 64, a display 70 and a memory 72 for telephony related functions of the mobile terminal. The operation of the transceiver 64 in making telephone calls is not described since this relates to conventional telephony activity of the mobile terminal 60. The CPU 62 controls the operation of the other elements.

Figure 9:
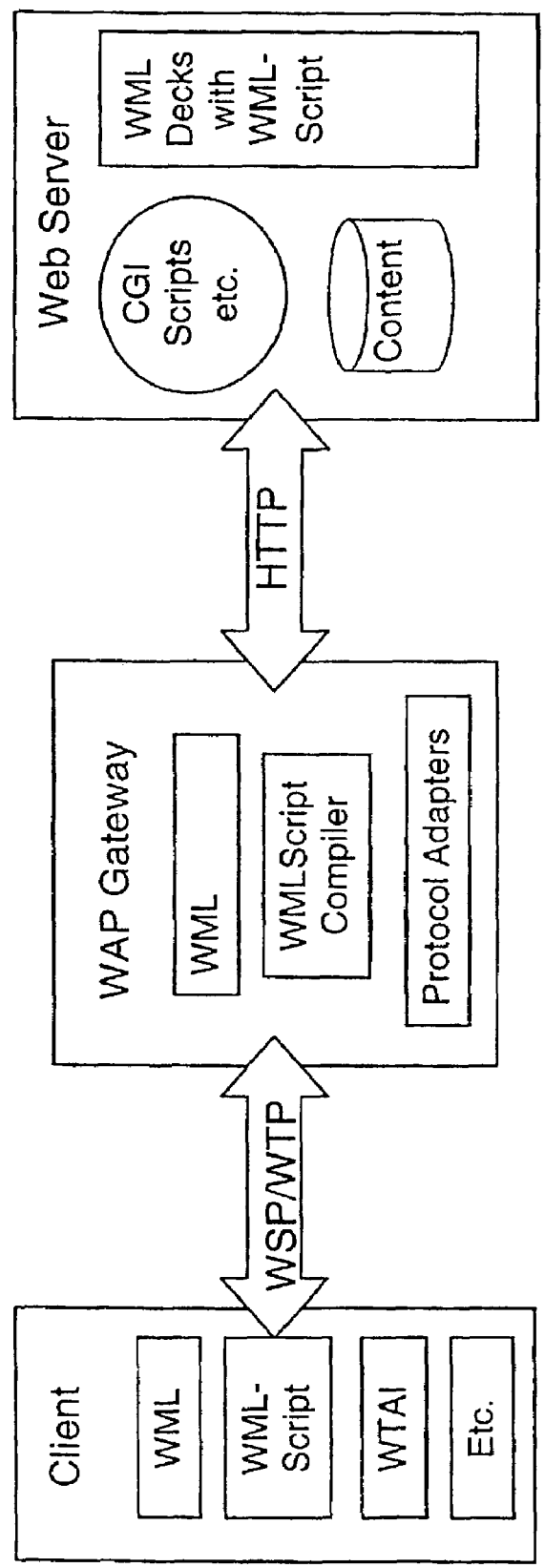
FIG. 9 shows the system according to FIG. 6 in a different form.

FIG. 9 shows the communications system of FIG. 6. It provides a different view showing details of the client (for example a mobile terminal, the gateway and a server, in this case a web server.

In the following are suggested some of the applications of the invention that are available in an embodiment in which WAP is used with bi-directional message streaming. Of course, most of these applications can be implemented with the existing WAP stack if the class 3 functionality is implemented on the application level.

In carrying out transactions involving data transfer, there are two main considerations: transmitting large amounts of data and ordering of the transactions. Transmitting a sequence of messages enables large amounts of data to be transferred continuously and also enables the transmission of ordered events. If multiple transactions are used, the order transmitting and receiving messages is not guaranteed and so this has to be controlled at the application level. Transmitting ordered events is important as many applications need small amounts of data to be transferred with events that are posted first arriving first.

The invention can be applied to video-conferencing. Such a video-conferencing system is provided having a number of the clients connected to a WAP enabled server acting as a distribution centre. Each client is connected to the server by a two-way stream for sending and receiving a stream of individual pictures or frames. Streaming is useful because the frame order is important and without streaming the application itself must reconstruct frame order. It is advantageous to combine video-conferencing with WAP. Advanced user interfaces can be provided as WML decks to select, convey information and to link conferences. The whole service can be provided a single WAP server. Another important application domain for WAP-based video services is a Bluetooth service where WAP could be used as a transport protocol for browsing/accessing video information.

In another embodiment, home devices or other devices are provided with mini WAP servers to make them accessible from WAP enabled clients. An example is a WAP enabled voice mail service that allows connections from a WAP browser to browse the status of messages and allow them to be listened to. A channel from the client to the server is used as a control channel to send commands and sound is streamed over a channel from the server to the client. Commands sent to the device may include skip message, delete message and so on.

In yet another embodiment, a remote control or a remote measurement system is provided in which a client connects to the central processing server providing measurement data coming in stream (such as real-time pressure data) and the controlling server sends back control or summary information in a stream. If the system is WAP enabled with stream support, it may be implemented in the form of a WAP server having WAP enabled clients.

In still another embodiment, a server-based gaming system is provided. In such a multi-player game system a centralised game server is provided to which clients connect. In the case of real-time action games, information is sent and received in a stream-like format in which the order of events is important. For example a player may not be allowed to interact after it has been "killed". The game server and the clients may be connected with a bi-directional stream protocol to ensure that events arrive in order.

In a further embodiment, a system having WAP-based intelligent map/location measurement services may be provided. In this system, a location information stream is sent to a server which in turn sends back map and map co-ordinate data. If the location update is frequent, because the tracking is very fine (like tracking a car in a city or tracking a walker so that he or she can find a particular shop) bi-directional streams are used to preserve the order of the transactions.

In yet a further embodiment, the invention may be used to access Internet-based multimedia applications. Such applications generally use TCP streams for connecting to a client. If such an application (for example a RealAudio service) is to be connected to a WAP-enabled client, stream-like (sequence of messages) support in WAP can be used rather than attempting to convert stream-like TCP into transaction-oriented WTP.

In still a further embodiment, a voice-controlled WAP services may be provided which accepts voice commands and/or sends voice messages to a user. Voice recognition of a service-specified command set may be difficult to provide for a lightweight terminal in terms of processing power and weight. Using the invention voice data may be sent on an outgoing channel to a WAP server where sophisticated recognition/language selection can be accomplished. Similarly, a return channel can be used to convey sound/voice data as a response.

The invention provides a new transaction class which can be used to provide an arbitrarily long sized sequence of messages within a single transaction. The invention is compatible with the WAP standard because in addition to the new features new transaction class 3 all the features of the WAP standard are kept.

Class 3 transactions can be identified and handled separately. The ways in which errors, version and TIDs are handled is the same as in the WAP standard.

In class 3 transactions, the message handling procedure also uses the existing segmentation and re-assembly process, and so no separate SAR process needs to be defined. However, it should be noted that the invention uses the existing segmentation and re-assembly procedure in two ways. It uses it in a way which is similar to that of class 2 in which messages are segmented in packets. In addition the invention also uses it to send a stream of messages irrespective of whether segmentation and re-assembly is being applied to a particular message. In either case, PSNs are always used. This is in contrast to class 2 transactions in which segmentation and re-assembly does not apply if there is only one packet.

Although the invention is described in relation to WAP, it can be applied to any other transaction based communication protocol. For example it can be applied to browsing on IP networks. It is particularly suitable for wireless networks but may also be applied to wired networks.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method, comprising:
transmitting data to a receiver over a wireless link on a wireless transaction protocol layer in the form of a plurality of data messages each message representing a service data unit and comprising at least one data packet,
receiving from the receiver over the wireless link an acknowledgement of receipt of data packets on the wireless transaction protocol layer so as to provide a reliable connection;
notifying the receiver of a last data packet in each data message so as to indicate transmission of the corresponding service data units; and
notifying the receiver of a last data message of the plurality of data messages.

2. A method according to claim 1, in which data is not of predetermined length.

3. A method according to claim 1, in which there is transmission of an arbitrarily long sized stream-like sequence of messages inside a transaction.

4. A method according to claim 1, in which the data packets are numbered consecutively by packets sequence numbers during transfer of the data.

5. A method according to claim 4, in which each message comprises packets having consecutive packet sequence numbers and the sequence of the packet sequence numbers continues from one message to the next message.

6. A method according to claim 4, in which the packet sequence numbers wrap around.

7. A method according to claim 1, in which each packet of the transaction has the same transaction identifier.

8. A method according to claim 1, in which the data is segmented and re-assembled.

9. A method according to claim 1, in which communication between the sender and the receiver is bi-directional within the transaction.

10. A method according to claim 9, in which there are two channels provided, one for transmitting data from an initiator to a responder and the other for transmitting data in the opposite direction.

11. A method according to claim 10, in which at least one of the channels is closed by sending of the last message of the data.

12. A method according to claim 10, in which the transaction is terminated if transmission over both channels is terminated.

13. A method according to claim 1, in which the packets are sent in groups of packets.

14. A method according to claim 13 in which the receiver acknowledges a complete group when all packets from the group have been received.

15. A method according to claim 14, in which the receiver acknowledges the last packet of a group when it has confirmed that the other packets of the group have been received.

16. A method according to claim 13, in which there can be outstanding packet groups such that packets of a subsequent group are allowed to be sent before an acknowledgement has been received for a previous group.

17. A method according to claim 13, in which there cannot be outstanding packet groups.

18. A method according to claim 17, in which a first message notifying of a missing packet is sent before a packet indicating the end of its packet group has been received.

19. A method according to claim 18 in which a second message notifying of the missing packet is sent if the packet indicating the end of its packet group has been received and the missing packet has still not been received.

20. A method according to claim 17, in which packets of a group are sent in transmission bursts and a packet notifying the completion of a particular group is not included in the transmission burst containing some packets of the particular group.

21. A method according to claim 20, in which the packet notifying the completion of a particular group is sent in a subsequent group.

22. A method according claim 20, in which the packet notifying the completion of a particular group is only sent when an acknowledgement has been received for all. of the packets of a previous group.

23. A method according to claim 1, where carrying out the transaction comprises one reliable Invoke message and one reliable Result message, where the Invoke and Result messages are expanded with reliable data messages.

24. A method according to claim 1, where the transaction is started by an Invoke message and the started transaction is continued by Stream Data messages.

25. A method according to claim 1, in which data transmission over one channel is terminated when the sender sends a TPI indicating the end of data and it is received by the receiver.

26. A method according to claim 1, in which there is more than one transaction outstanding at any one time.

27. A method according to claim 1, in which there are a number of asynchronous transactions existing in a single session.

28. A method according to claim 1, in which a first message of the transaction is an Invoke PDU message, wherein the Invoke PDU message comprises a transaction class parameter to indicate that the transaction comprises a data stream having an arbitrarily long length.

29. A method, comprising:
receiving data at a receiver over a wireless link on a wireless transaction protocol layer in the form of a plurality of data messages each message representing a service data unit and comprising at least one data packet,
acknowledging by the receiver a receipt of data packets on the wireless transaction protocol layer so as to provide a reliable connection;
receiving a notification of a last data packet in each data message in the receiver so as to indicate transmission of the corresponding service data units; and
receiving in the receiver a notification of a last data message of the plurality of data messages.

30. A mobile terminal for transmitting data in the form of a plurality of data messages each message representing a service data unit and comprising at least one data packet the mobile terminal comprising an application contained in a memory and a protocol stack of a Wireless Transaction Protocol (WTP), the application and the protocol stack carrying out a transaction having an arbitrary number of data messages over a wireless link between the mobile terminal and a receiver, the mobile terminal being capable of
sending the messages to the receiver over a wireless link on a wireless transaction protocol layer in a sequence,
receiving from the receiver over the wireless link an acknowledgement of receipt of the packets on the wireless transaction protocol layer so as to provide a reliable connection,
notifying the receiver of a last data packet in each data message so as to indicate transmission of the corresponding service data units, and
notifying the receiver of a last data message of the plurality of data messages.

31. A gateway for transmitting data in the form of a plurality of data messages each message representing a service data unit and comprising at least one data packet the gateway comprising an application contained in a memory and a protocol stack of a Wireless Transaction Protocol (WTP), the application and the protocol stack carrying out a transaction having an arbitrary number of data messages over a wireless link between the gateway and a receiver, the gateway being capable of
sending the messages to the receiver on a wireless transaction protocol layer in a sequence,
receiving from the receiver over the wireless link an acknowledgement of receipt of the packets on the wireless transaction protocol layer so as to provide a reliable connection,
notifying the receiver of a last data packet in each data message so as to indicate transmission of the corresponding service data units, and
notifying the receiver of a last data message of the plurality of data messages.

32. A data transmission system comprising at least one mobile terminal, the mobile terminal comprising an application contained in a memory and a protocol stack of a Wireless Transaction Protocol (WTP), and being capable of receiving data in the form of a plurality of data messages, each message representing a service data unit and comprising at least one data packet, the application and the protocol stack of the mobile terminal carrying out a transaction having an arbitrary number of data messages over a wireless link with a gateway, wherein the gateway is capable of sending the messages on a wireless transaction protocol layer to the mobile terminal in a sequence, the mobile terminal is capable of acknowledging receipt of the packets over the wireless link on the wireless transaction protocol layer so as to provide a reliable connection, the gateway is capable of notifying the mobile terminal of a last data packet in each data message so as to indicate transmission of the corresponding service data units, and the gateway is capable of notifying the mobile terminal of a last data message of the plurality of data messages.

33. A data transmission system comprising at least one mobile terminal, the mobile terminal comprising an application contained in a memory and a protocol stack of a Wireless Transaction Protocol (WTP), and being capable of transmitting data in the form of a plurality of data messages, each data message representing a service data unit and comprising at least one data packet, the application and the protocol stack of the mobile terminal carrying out a transaction having an arbitrary number of data messages over a wireless link with a gateway, wherein the mobile terminal is capable of sending the messages to the gateway on a wireless transaction protocol layer in a sequence, the gateway is capable of acknowledging receipt of the packets on the wireless transaction protocol layer so as to provide a reliable connection, the mobile terminal is capable of notifying the gateway of a last data packet in each data message so as to indicate transmission of the corresponding service data units, and the mobile terminal is capable of notifying the gateway of a last data message of the plurality of data messages.

34. A computer readable medium storing a computer program executable to perform operations to cause a computer to carry out a transaction having an arbitrary number of data messages over a wireless link between a sender and a receiver, according to a Wireless Transaction Protocol (WTP), the operations comprising:
creating the transaction comprising transmission data comprising a plurality of data messages each message representing a service data unit and comprising at least one data packet;
sending the messages to the receiver on a wireless transaction protocol layer in a sequence;
receiving acknowledgement from the receiver of a receipt of packets on the wireless transaction protocol layer, where the acknowledgement provides an indication of a reliable connection;
notifying the receiver of a last data packet in each data message so as to indicate transmission of the corresponding service data units; and
notifying the receiver of a last data message of the plurality of data messages.

35. A computer readable medium storing a computer program executable to perform operations to cause a computer to carry out a transaction having an arbitrary number of data messages over a wireless link between a sender and a receiver, according to a Wireless Transaction Protocol (WTP), the operations comprising:
receiving transmission data on a wireless transaction protocol layer comprising a plurality of data messages each message representing a service data unit and comprising at least one data packet, where the messages are received in a sequence;

acknowledging a receipt of packets on the wireless transaction protocol layer, where the acknowledgement provides an indication of a reliable connection;

receiving a notification of a last data packet in each data message so as to indicate transmission of the corresponding service data units; and receiving a notification of a last data message of the plurality of data messages.

36. An apparatus, comprising:

a transceiver;

the transceiver configured to transmit data to a receiver over a wireless link on a wireless transaction protocol layer in the form of a plurality of data messages each message representing a service data unit and comprising at least one data packet, the transceiver further configured to receive from the receiver over the wireless link an acknowledgement of receipt of data packets on the wireless transaction protocol layer so as to provide a reliable connection;

the transceiver coupled to a processor configured to notify the receiver of a last data packet in each data message so as to indicate transmission of the corresponding service data units; and the transceiver coupled to the processor further configured to notify the receiver of a last data message of the plurality of data messages.

37. An apparatus, comprising:

means for transmitting data to a receiver over a wireless link on a wireless transaction protocol layer in the form of a plurality of data messages each message representing a service data unit and comprising at least one data packet, means for receiving from the receiver over the wireless link an acknowledgement of receipt of data packets on the wireless transaction protocol layer so as to provide a reliable connection;

means for notifying the receiver of a last data packet in each data message so as to indicate transmission of the corresponding service data units; and means for notifying the receiver of a last data message of the plurality of data messages.

38. The apparatus of claim 37, where the means for transmitting and receiving comprises a transceiver and the means for notifying comprises a processor coupled to the transceiver.

* * * * *